United States Patent
Yen et al.

(10) Patent No.: US 6,267,911 B1
(45) Date of Patent: *Jul. 31, 2001

(54) PHOSPHORS WITH LONG-PERSISTENT GREEN PHOSPHORESCENCE

(75) Inventors: William M Yen, Athens, GA (US); Weiyi Jia, Mayaquez, PR (US); Lizhu Lu; Huabiao Yuan, both of Athens, GA (US)

(73) Assignees: University of Georgia Research Foundation, Inc., Atlanta, GA (US); University of Puerto Rico, San Juan, PR (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,943

(22) Filed: Nov. 6, 1998

Related U.S. Application Data

(60) Provisional application No. 60/064,690, filed on Nov. 7, 1997, and provisional application No. 60/064,691, filed on Nov. 7, 1997.

(51) Int. Cl.$^7$ .................................................. C07K 11/80
(52) U.S. Cl. .................................... 252/301.4 R; 117/946
(58) Field of Search ...................... 252/301.4 R; 117/946

(56) References Cited

U.S. PATENT DOCUMENTS

| 3,294,699 | 12/1966 | Lange | 252/301.4 R |
| 4,623,816 | 11/1986 | Hoffman et al. | 313/487 |
| 5,424,006 * | 6/1995 | Murayama et al. | 252/301.4 R |

FOREIGN PATENT DOCUMENTS

| 710709 A1 | 8/1996 | (EP) . |
| 765925 A1 | 2/1997 | (EP) . |
| 51031037 | 7/1976 | (JP) . |
| 5078659 | 3/1993 | (JP) . |
| 94029416 B2 | 4/1994 | (JP) . |
| 94029417 B2 | 4/1994 | (JP) . |

OTHER PUBLICATIONS

Katsumata et al, "Effects of Composition on the Long Phosphorescent SrAl2O4:Eu 2+, Dy3+ Phosphor Crystals", J. Electrochem. Soc. vol. 144, No. 9, pp. L243–L245, Sep. 1997.*

(List continued on next page.)

Primary Examiner—C. Melissa Koslow
(74) Attorney, Agent, or Firm—Greenlee, Winner and Sullivan, P.C.

(57) ABSTRACT

This invention relates to phosphors including long-persistence green phosphors. Phosphors of the invention are represented by the general formula:

$$M_kAl_2O_4:2xEu^{2+},2yR^{3+}$$

wherein k–1–2x–2y, x is a number ranging from about 0.0001 to about 0.05, y is a number ranging from about x to about 3x, M is an alkaline earth metal, and $R^{3+}$ is one or more trivalent metal ions. Phosphors of this invention include powders, ceramics, single crystals and single crystal fibers. A method of manufacturing improved phosphors and a method of manufacturing single crystal phosphors are also provided.

47 Claims, 15 Drawing Sheets

OTHER PUBLICATIONS

Matsuzawa et al, "A New Long Phosphorescent Phosphor With High Brightness SrAl204:Eu 2+, Dy 3+", J. Electrochem. Soc. vol. 143, No. 8, pp. 2670–2673, Aug. 1996.*

Abbruscato et al. (1971), "Optical and Electrical Properties of $SrAl_2O_4:Eu^{2+}$" J. Electrochem. Soc. 118(6):930–933, No Month.

Autrata, R. et al. (1983), "Single–Crystal Aluminates—A New Generation of Scintillators for Scanning Electron Mocroscopes and Transparent Screens in Electron Optical Devices," Scanning Electron. Microsc., pp. 489–500, No Month.

Chen, R. and McKeever, S.W.S. (1997), Theory of Thermoluminescence and Related Phenomena, World Scientific, Singapore, pp. 1–81, No Month.

Chemekova et al. (1977) Terzisy Dokl. Uses. Soveshch. Rostu. Krist. $5^{th}$ 2:184–185 (Chem. Abst. (1980) 93:85423h), No Month.

Czochralski, J. (1918), "Ein neues Verfahren zur Messung der Kristallisationsgeschwindigkeit der Metalle," Z. Phys. Chem. 92:219–221, No Month.

Jia, W. (1998), "Phosphorescent dynamics in $SrAl_2O_4:Eu^{2+}$, $Dy^{3+}$ single crystal fibers," J. Luminescence 76 & 77:424–428.

Katsumata, T. et al. (1998), "Growth and characteristics of long persistent $SrAl_2O_4$– and $CaAl_2O_4$–based phosphor crystals by a floating zone technique," J. Cryst. Growth 183:361–365.

Katsumata, T. et al. (1998), "Characteristics of Strontium Aluminate Crystals Used for Long–Duration Phosphors," J. Am. Ceram. Soc. 81:413–416.

Katsumata, T. et al. (1997), "Effects of Composition on the LOng Phosphorescent $SrAl_2O_4:Eu^{2+}$, $Dy^{3+}$ Phosphor Crystals," J. Electrochem. Soc. 144(9):L243–L245.

Kutty, T.R. et al. (1990), "Luminescence of the $Eu^{2+}$ in Strontium Aluminates Prepared by the Hydrothermal Method," Mater. Res. Bull. 25:1355–1362.

Matsuzawa, T. et al. (1996), "A New Long Phosphorescent Phosphor with High Brightness, $SrAl_2O_4:Eu^{2+},Dy^{3+}$," J. Electochem. Soc. 143(8):2670.

Palilla, F.C. et al. (1968), "Fluorescent Properties of Alkaline Eath Aluminates of the Type $MAl_2O_4$ Activated by Divalent Europium," J. Electrochem. Soc. 115(6):642–644.

Pfann, W.G. (1952), "Principles of Zone–Melting," Trans. AIME 194:747–753.

Shionoya, S. (1998) in *Phosphor Handbook*, Shionoya, S. and Yen, W.M. (eds.), CRC Press, Inc., Boca Raton, New York, p. 3.

Smets, B. et al. (1989), "$2SrO·3Al_2O_3:Eu^{2+}$ and 1.29(Ba, Ca)O,$6Al_2O_3:Eu^{2+}$. Two New Blue–Emitting Phosphors," J. Electrochem. Soc. 136(7):2119–2123.

Tisssue, B.M. et al. (1991), "Laser–heated pedestal growth of laser and IR–upconverting materials," J. Cryst. Growth 109:323–328.

Yen, W.M. (1995) "Preparation of single crystal fibers," in *Insulating Materials for Optoelectronics*, F. Agullo–Lopez, ed., World Scientific, Singapore, Chapter 2, p. 77.

Zlotnikova et al. (1990) Ukr. Khim Zh. (Russ. Ed.) 56(11):1148–1151 (Chem. Abst. (1991)115:37798k).

Zorencko, Yu.V. et al. (1991), "The Peculiarities of Receiving of Thin Film Single Crystal Oxide Luminophores," Cryst. Properties and Preparation 36–38:226–233.

* cited by examiner

PHOSPHORS WITH LONG-PERSISTENT GREEN PHOSPHORESCENCE

CROSS-REFERENCE TO RELATED APPLICATIONS

This application takes priority under 35 U.S.C. §119(e) from U.S. provisional applications No. 60/064,690, filed Nov. 7, 1997 and No. 60/064,691, filed Nov. 7, 1997, both of which are incorporated by reference herein to the extent not inconsistent herewith.

This invention was made at least in part with U.S. government funding through NASA grant MURC-NCCW-0088 and NCC5–252, ARO DAAH04–96–10416 and DOE DE-FG02–94ER75764. The United States government has certain rights in this invention.

FIELD OF THE INVENTION

This invention relates to phosphors, particularly long-persistence green phosphorescence. The invention is also directed to methods of making phosphors in powder, ceramic and crystalline (e.g., single crystalline) form. The phosphors of the invention are $Eu^{2+}$-activated alkaline earth aluminates, particularly strontium aluminates.

BACKGROUND OF THE INVENTION

Persistent phosphorescing materials, such as ZnS:Cu,Co, ZnCdS:Cu and CaSrS:Bi, have been used for many years. Recently a much brighter and longer persistence green phosphor, $SrAl_2O_4:Eu^{2+}:Dy^{3+}$ has been produced.

Strong green luminescence from $Eu^{2+}$-doped $SrAl_2O_4$ was reported by H. Lange in Belgian patent 1,347,45 and U.S. Pat. No. 3,294,699. Efficient luminescence in the spectral range 450–520 nm was also reported from $Eu^{2+}$-doped $CaAl_2O_4$, $MgAl_2O_4$, $BaAl_2O_4$, and $SrAl_2O_4$ and their counterparts using alkaline earth cationic combinations. (F. C. Palilla, A. K. Levine and M. R. Tomkus (1986), "Fluorescence properties of alkaline earth aluminates of the type $MAl_2O_4$ activated by divalent europium," J. Electrochem. Soc. 115:642).

Long lasting and more efficient phosphorescence has obtained in $Eu^{2+}$ doped $SrAl_2O_4$ synthesized with excess alumina which results in formation of trapping centers associated with the $Sr^{2+}$ vacancy (Abbruscato et al. (1971) J. Electrochem. Soc. 118:930).

Improved long persistence phosphors of certain alkaline earth aluminates were reported by T. Matsuzawa, Y. Aoki, N. Takeuchi and Y. Murayama (1996) J. Electrochem. Soc. 143(8):2670, and in U.S. Pat. No. 5,424,006. The brightness and persistence time of $SrAl_2O_4:Eu^{2+}$ was improved by co-doping various trivalent rare earth ions to produce appropriate trapping centers. The best result was obtained by co-doping $Dy^{+3}$ with $EU^{2+}$ into $SrAl_2O_4$ and $Nd^{+3}$ with $Eu^{2+}$ into $CaAl_2O_4$ to get long persistent green and purple emission, respectively. U.S. Pat. No. 5,424,006 also reports phosphors in which $Mg^{2+}$ is substituted for $Sr^{2+}$ in $SrAlO_4:Eu^{2+}$, $Dy^{3+}$ phosphors.

EP published application 765,925 (Moriyama et al.) reports $Eu^{2+}$-activated strontium aluminate phosphors in which part of the $Sr^{2+}$ of the host is replaced with $Pb^{+3}$, $Dy^{+3}$ or $Zn^{2+}$. The zinc-doped materials are reported to display enhanced brightness and persistence compared to $SrAlO_4:Eu^{2+}$, $Dy^{3+}$.

EP published application 710,709 (Murayama et al.) reports phosphors of matrix $M_{1-x}Al_2O_{4-x}$ where M is at least one metal selected from calcium, strontium, barium and, optionally, magnesium, and x is a number not equal to 0. The matrix comprises europium and a rare earth metal, manganese, tin or bismuth as co-activators.

JP Patent 76031037 (1976, Tokyo Shibaura Electric Co.) reports blue-emitting phosphors containing barium (or calcium or strontium)-potassium (or sodium) aluminates activated with europium and manganese.

JP Patent 94029417 (1994, Matsushita Electronics) reports a strontium aluminate phosphor activated with europium modified by incorporation of yttrium oxide.

JP Patent 94029416 (1994, Matsushita Electronics) reports a europium activated barium aluminate phosphor containing yttrium oxide to enhance phosphorescence.

Zlotnikova et al. (1990) Ukr. Khim Zh. (Russ. Ed.) 56(11):1148–1151 (Chem. Abst. (1991) 115:37798k) reports composition dependence of catho-luminescent properties of a Dy-doped $SrAl_2O_4$-$Sr\,Al_4O_7$ system.

T. R. Kutty et al. (1990) Mater. Res. Bull. 25:1355–1362 report luminescence of $Eu^{2+}$ in strontium aluminates prepared by the hydrothermal method. Blue to green luminescent phosphors of general formula $Sr_nAl_2O_{3+n}$ where $n \leqq 1$ are reported. The reference also reports the preparation of certain aluminoborates.

B. Smets et al. (1989) J. Electrochem. Soc. 136(7): 2119–2123 reports blue-emitting phosphors: $2SrO.3Al_2O_3:Eu^{2+}$ and $1.29\,(Ba, Ca)O, 6\,Al_2O_3:Eu^{2+}$. In the background section of the reference the authors refer to an earlier report of blue-green emitting phosphors $4SrO.7Al_2O_3:Eu^{2+}$ and $BaO4Al_2O_3:Eu^{2+}$ which could be synthesized only in the presence of small amounts of $B_2O_3$.

Chemekova et al. (1977) Terzisy Dokl. Uses. Soveshch. Rostu. Krist. 5th 2:184–185 (Chem. Abst. (1980) 93:85423h) reports synthesis of single crystals in the calcium oxide-alumina system. Addition of Europium is said to produce phosphors.

SUMMARY OF THE INVENTION

This invention provides improved green phosphors of alkaline earth aluminates, particularly improved phosphors based on $SrAl_2O_4:Eu^{2+},Dy^{3+}$. Improvements in brightness and phosphorescence persistence are achieved by various co-doping schemes and/or by selective synthesis of the alkaline earth aluminate host using a quenching step which is believed to generate the host containing β-phase (high temperature phase) aluminate.

Improvements to brightness and persistence are achieved by doping divalent ions, $Mg^{2+}$ or $Zn^{2+}$ into the $Eu^{2+}$-activated, trivalent metal ion-doped phosphor to replace $Al^{3+}$ in the host. Preferably the amount of $Mg^{2+}$ or $Zn^{2+}$ introduced in the phosphor is substantially equivalent to the molar amount of trivalent rare earth metal (e.g., $Dy^{3+}$). It is believed that this type of substitution reduces the charge defects induced by substitution of the trivalent rare earth ion sites into alkaline earth metal ion sites (e.g., $Sr^{2+}$ sites) in the aluminate.

Improvements in phosphor properties are also achieved by doping monovalent alkali metal ions: $Li^+$, $Na^+$, $K^+$, $Cs^+$, and $Rb^+$ into the $Eu^{2+}$-activated, trivalent metal ion-co-doped phosphor to replace alkaline earth metal ion (e.g., $Sr^{2+}$) in the host. Preferred alkali metal ions are $Na^+$ and $K^+$. Preferably the amount of monovalent ion introduced into the phosphor is substantially equivalent to the molar amount of trivalent rare earth metal ion (e.g., $Dy^{3+}$). It is believed that this type of substitution also reduces the charge defects induced by substitution of the trivalent rare earth ion sites into alkaline earth metal ion sites (e.g., $Sr^{2+}$ sites) in the aluminate.

Improvements in phosphor properties, particularly phosphor brightness, are further achieved by codoping $Y^{3+}$, $La^{+3}$, $Lu^{-3}$, $Gd^{+3}$ and $Bi^{3+}$ into the $Eu^{2-}$-activated, trivalent metal ion-doped phosphor to replace alkaline earth metal ion (e.g., $Sr^{2+}$) in the host. Co-doping with $Y^{+3}$ is more preferred. The amount of $Y^{+3}$ that can be introduced to replace the alkaline earth metal ion is up to three times the molar amount of other trivalent rare earth metal ions (eg., $Dy^{3+}$).

A separate aspect of this invention is the discovery that application of a quenching step after sintering during the synthesis of the alkaline earth aluminate phosphors results in phosphors with significantly improved properties. The phosphors produced using this quenching step exhibit improved brightness and longer persistence than analogous phosphors prepared without use of the quenching step (non-quenched phosphors.)

Without wishing to be bound by any particular theory, it is presently believed that application of the quenching step to the phosphors of this invention after sintering results in the formation of alkaline earth aluminate phosphor at least in part in the high temperature phase (D-phase). Phosphor material prepared without such a quenching step is believed to be substantially in the lower temperature phase ($\alpha$-phase). Application of the quenching step in the synthesis of $SrAl_2O_4$ matrix phosphors is believed to generate phosphors containing the high temperature phase, $\beta$-$SrAl_2O_4$. Non-quenched $SrAl_2O_4$ is believed to be substantially (50% by weight or more) in the $\alpha$-phase. The specific quenching of $SrAl_2O_4$ is accomplished by rapid cooling of the sintered material from a temperature at or above about 650° C. to about room temperature. The $\beta$-phase-containing phosphors are believed to exhibit improved phosphorescence properties. With this view in mind, preferred phosphors are those composed substantially of $\beta$-phase material (i.e., greater than 50% by wt). More preferred are phosphors composed of greater than about 75% by wt. of $\beta$-phase material.

This invention relates to phosphors, particularly to phosphors subjected to quenching during synthesis, to phosphors formed as ceramics and to methods of making improved phosphors by application of a quenching step to retain high temperature phase material.

In general, the phosphors of this invention have a variety of applications for the manufacture of luminous materials, night vision apparatus and in optoelectronic devices.

This invention also provides single crystal phosphors with long persistence times. The crystals have a general formula $MAl_2O_4$, where M stands for Sr, Ca, Ba or a combination of Sr, Ba, or Ca. These materials are doped with $Eu^{2+}$ as an activator, and co-doped with $Dy^{3+}$, $Nd^{3+}$, or other trivalent rare earth ions or $Bi^{3+}$ (most generally $R^{3+}$) or combinations of these ions. The trivalent metal ions are believed to act as trapping centers. The single crystal phosphors can also be prepared from $MAl_2O_4$:$Eu^{2+}$, $R^{3+}$ in which $Mg^{2+}$or $Zn^{2+}$ are substituted for $Al^{3+}$ or in which $Na^+$ or $K^+$ (or other alkali metal ions) are substituted for $M^{2+}$ as charge compensators. These crystals phosphoresce at wavelengths of 520 nm ($SrAl_2O_4$:$Eu^{2-}$,$Dy^{3+}$) or 440 nm ($CaAl_2O_4$:$Eu^{2+}$,$Nd^{3+}$) with persistence times longer than about 15 hours.

The single crystals of this invention have direct application to the manufacture of phosphorescent jewelry and related items for ornamentation or apparel. In addition, due to their strong phosphorescent properties, the crystals can have important applications in optoelectronic technology, such as in image storage and in memory devices.

The oxide phosphors of this invention are chemically stable and believed to represent no significant hazard to the environment.

DETAILED DESCRIPTION OF THE INVENTION

Figure 1:
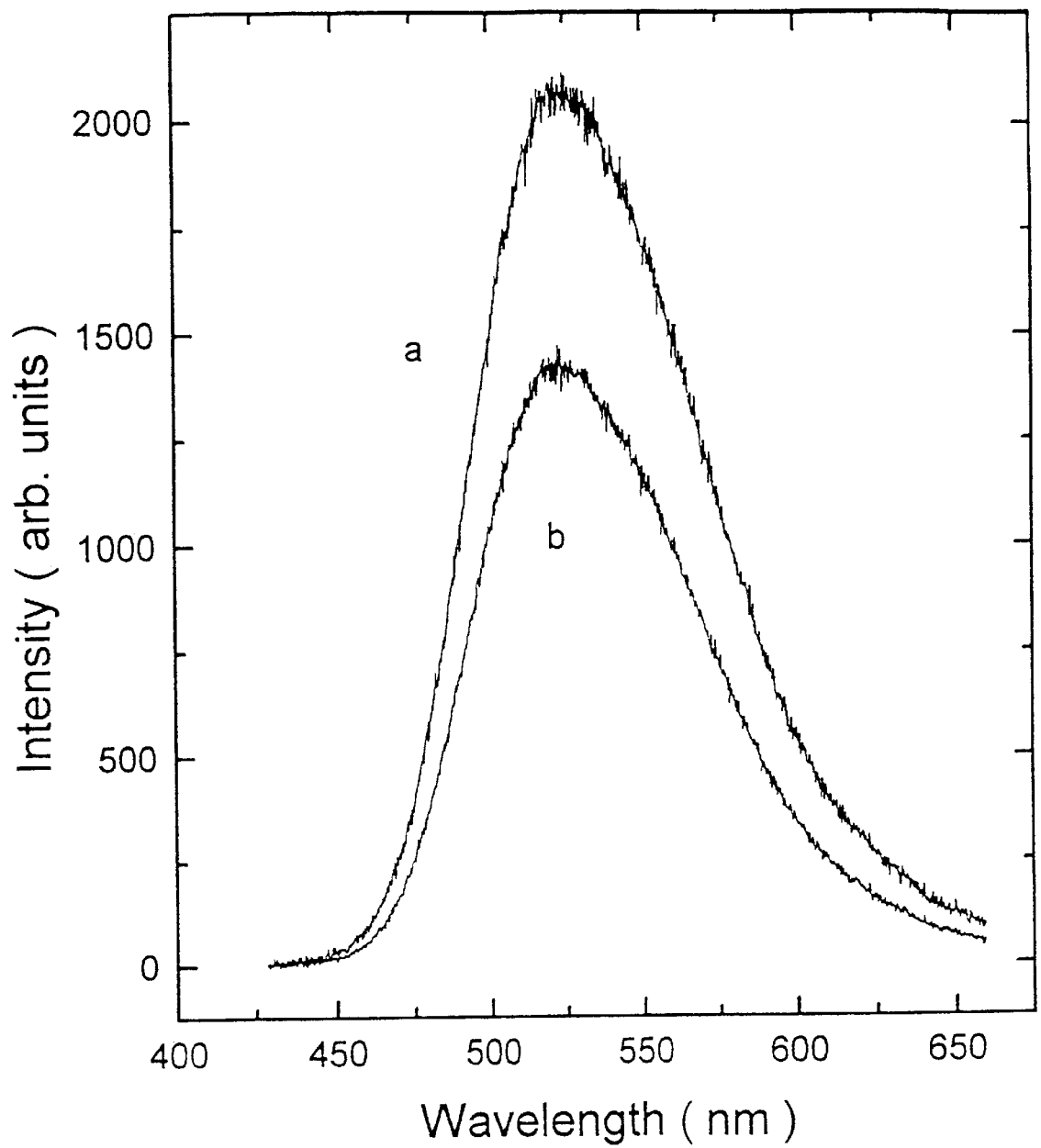
FIG. 1 illustrates the luminescent spectra of (a) $\beta$-$SrAl_2O_4$:0.02 $Eu^{2+}$, 0.02 $Dy^{3+}$ and the corresponding $\alpha$-phase material (b). In the Figures, the term $\beta$-$SrAl_2O_4$ (or $\beta$-phase material) refers to phosphors subjected to quenching as described in the Examples, and the term $\alpha$-$SrAl_2O_4$ (or $\alpha$-phase material) refer to phosphors not subjected to quenching during synthesis.

This invention relates to long-persistence green phosphors. Several basic physical factors should be considered in developing such phosphors. Phosphors of this invention are based on addition of an activator (an emitter) to a host matrix. The host (or matrix) and activator are selected to provide the desired color (dependent upon the wavelength of emission) and high quantum efficiency. The energy of the localized ground state of the activator should be well above the valence band of the host to allow persistent phosphorescence to occur.

The hosts of this invention are alkaline earth aluminates $MAl_2O_4$ (where M is an alkaline earth or mixture of alkaline earths, e.g., Sr, Ca and/or Ba) The activator employed in the phosphors of this invention is $Eu^{2+}$.

Persistent phosphorescence was discovered in the 11th century in China and Japan and in the 16th century in Europe (Shionoya, S. (1998) in *Phosphor Handbook,* Shionoya, S. and Yen, W. M. (eds.), CRC Press, Inc., Boca Raton, N.Y., p. 3). The phenomenon involves two kinds of active centers: emitters and traps. The phosphorescent dynamics are complex and many aspects remain unclear. Thennoluminescence and photostimulable phosphorescence are physically governed by mechanisms similar to persistent phosphorescence (Chen R and McKeever, S. W. S. (1997), Theory of Thermoluminescence and Related Phenomena, World Scientific, Singapore; Sonoda, M. et al. (1983) Radiology 148:833). The main difference between these three phenomena appears to be the depth of traps. When a phosphor possesses centers with certain trapping depth which can be effectively activated at room temperature, it will show persistent phosphorescence. Deeper trapping centers can be activated by heating or photostimulation. Therefore, a study of phosphorescence dynamics allows the characterization of these three important luminescence processes. Single crystal phosphors facilitate studies of phosphorescence dynamics.

The traditional persistent phosphors are sulfides, ZnS, CdS, CaS and SrS, and their mixed crystals. All of these compounds have high vapor pressure, and it has generally been difficult to grow crystals from the melt.

Phosphor materials of this invention can exhibit enhanced phosphorescence intensity and/or long persistence of phosphorescence. Preferred phosphors of this invention have intensity enhanced (as measured in a similar measurement system) compared to a standard commercial sample of ZnS phosphor. Persistence of phosphorescence is measured herein as persistence time which is the time after discontinuing irradiation that it takes for phosphorescence of a sample to decrease to the threshold of eye sensitivity. This threshold is the signal level of emission intensity that a naked (i.e., unaided) eye can clearly see in the dark. Persistence times are assessed by following phosphorescence intensity as a function of time. Clearly measurement comparisons of persistence times must be performed under identical conditions using the same detection systems. The term "persistent phosphors" has been applied to materials exhibiting phosphorescence lasting from minutes to hours. The term "long-persistent phosphor" historically has been used to refer to ZnS:Cu, CaS:Eu, Tm and similar materials which have a persistence time of 20 to 40 minutes. Materials herein can exhibit persistence time up to about 16–18 hrs or more. It is generally the case that phosphors having longer persistence times are more preferred. Preferred phosphor materials, including single crystals and single crystal fibers, of this invention can exhibit phosphorescence persistence times of greater than about 3–5 hrs. More preferred phosphors exhibit persistence times greater than about 10–12 hrs. Most preferred phosphors exhibit persistence times of greater than about 15–18 hrs. Persistence times of ceramics can be longer or shorter than those of single crystals of the same materials.

Phosphors of this invention have the general formula:

$M_kAl_2O_4:2xEu^{2+}, 2yR^{3+}$ where k is 1-2x-2y; x can range from about 0.0001 to about 0.05 and is preferably about 0.001 to about 0.02; y can range from about 0.0001 to about 0.15 and is preferably equal to 2x; M is most generally an alkaline earth metal, but is preferably Sr or a mixture of Sr with Ca, or Ba or both Ca and Ba; R is generally one or more trivalent metal ions, but is preferably a trivalent metal ion selected from the group:$Pr^{3+}$, $Ho^{3+}$, $Nd^{3+}$, $Dy^{3+}$, $Er^{3-}$, $La^{3+}$, $Lu^{3+}$, $Ce^{3+}$, $Y^{3+}$, $Sm^{3+}$, $Gd^{3+}$, $Tb^{3+}$, $Tm^{3+}$, $Yb^{3+}$, $Bi^{3+}$ and combinations thereof. The preferred trivalent metal ion dopant is $Dy^{3+}$ or its combination with $Y^{3+}$.

Although not wishing to be bound by any particular theory, it is believed that long persistence time in the activated matrix phosphors of this invention is obtained by creating proper trapping centers in the matrix. Such trapping centers can store excitation energy and release it gradually to the emitter.

Doping of trivalent metal ions, particularly trivalent rare earth metal ions and the Group VA metal ion $Bi^{3+}$, into the host matrix of this invention results in improved phosphorescence brightness and persistence time. Dopants for creating trapping centers include trivalent rare earth metal ions: $Pr^{3+}$, $Ho^{3+}$, $Nd^{3+}$, $Dy^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, and $Yb^{3+}$ and tlivalent Bi.

This invention demonstrates that energy efficiency, the brightness and the persistence time of phosphors are improved by addition of charge compensators to the host matrix. In addition the use of charge compensators reduces the occurrence of quenching centers originating from various defects, such as color centers, which will reduce or kill luminescence. Phosphors of this invention include those in which a portion of $Al^{3+}$ in the host is replaced with divalent ions, such as $Mg^{2+}$ or $Zn^{2+}$ and those in which a portion of the alkaline earth metal ion ($M^{2+}$) is replaced with a monovalent alkali metal ion, such as $Li^+$, $Na^+$, $K^+$, $Cs^+$ or $Rb^+$. These monovalent and divalent ions are believed to act as charge compensators.

This invention specifically exemplifies phosphors in powder or ceramic form prepared by combining the host, activator and trivalent metal ion dopants with a flux material. The flux is, however, optional in these formulations. The flux material of most interest is $B_2O_3$. In the phosphors of this invention flux is used to improve solid state chemical reaction. The phosphors of this invention can be made by the following general method. Phosphor components are combined as indicated in stoichiometric formulas (with or without a flux). The mixture is treated to form a homogeneous fine powder, for example by milling or grinding. The powder is preferably pressed into pellets. The powder or pellets are prefired at temperatures between about 600 to 800° C. (dependent upon the phase transitions of the material) in air for about 1–2 hrs. The prefired material is again treated to form a fine homogeneous powder (e.g., milling, grinding, pulverizing) suitable for sintering. Preferably, the powder is pelleted before sintering. The powder or pellets are the sintered at about 1 300° C. under a reducing atmosphere, e.g., $H_2/N_2$ having 2–5% by volume $H_2$.

$B_2O_3$ can be replaced in all formulations of this invention by an amount of $H_3BO_3$ sufficient to provide an equivalent molar amount of B (i.e., $2H_3BO_3$ replace each $B_2O_3$).

This invention is based at least in part on the finding that the method of synthesis of the host materials, e.g., the alkaline earth aluminates, can be an important factor in obtaining phosphors with improved persistence and brightness. Application of a quenching step to rapidly cool sintered material from the sintering temperature to lower temperatures (e.g. to room temperature) is found to produce phosphor material with improved phosphor properties. In particular, application of an air quenching step to the sintered alkaline earth aluminates of this invention results in an improved phosphor material. More specifically, the alkaline earth aluminate is optionally cooled to an intermediate high temperature between about 650° C. and about 750° C. and then quenched by removing the material to a room temperature environment (air quenching).

Materials specifically exemplified herein are intially cooled from the sintering temperature to an intermediate high temperature for practical reasons to avoid thermal shock breakage of the ceramic container or the sintering chamber during synthesis. Rapid quenching of the material from the sintering temperature, if practical, would be preferred to ensure formation of improved phosphor materials.

Materials specifically exemplified herein are quenched in air, i.e., taken from a furnace an placed in a room temperature environment. Air quenching is simply a convenient way of achieving the desire rapid cooling. It is not necessary to quench the materials to room temperature. Suitable materials can be made by quenching to a temperature somewhat above room temperature (e.g., less than or equal to about 100° C.) Alternatively, materials may be quenched by rapid cooling in water, ice or by using coolants, including dry ice, liquid nitrogen, etc.

It is presently believed that the quenching step applied to alkaline carth aluminate phosphors facilitates formation of high temperature phase material at temperature substantially lower than the phase transition temperature (e.g., at room temperature). For example, $SrAl_2O_4$ undergoes a phase transition at 650° C. between a high temperature β-phase and a lower temperature α-phase. The crystal structure of the high temperature phase, $β-SrAl_2O_4$, is hexagonal. The structure of the room temperature phase, $α-SrAl_2O_4$, is monoclinic. The optional intennediate cooling step applied in exemplified phosphor materials cools the materials to a temperature above the phase transition temperature (greater than or equal to 650° C.). Materials held at the intermediate temperature (above the phase transition temperature) are rapidly cooled (quenched). Quenched alkaline earth aluminates are believed to comprise at least in part β-phase alkaline earth aluminate.

$Eu^{2+}$-activated $SrAl_2O_4$ phosphors prepared using a quenching step are demonstrated herein to provide better phosphorescent performance than phosphors prepared using the corresponding non-quenched, presumably substantially α-phase material. Quenched-$SrAl_2O_4$ co-doped with $Eu^{3+}$ and trivalent metal ions, particularly trivalent rare earth metal ions, exhibit much brighter and longer phosphorescence than the corresponding non-quenched phosphors.

$β-SrAl_2O_4$ green phosphors can be synthesized using a quenching step in the sintering cycle. The quenching method can be employed to synthesize $SrAl_2O_4$ phosphors containing β-phase material activated with $Eu^{2+}$ and doped with trivalent metal ions as well as those phosphors containing β-phase material in which divalent and monovalent ions are substituted into the matrix.

Charge compensators can be included in either β(quenched)- and α(non-quenched)-$SrAl_2O_4$ to reduce the number of phosphorescence quenching centers existing in these materials. In both matrices, $Al^{3+}$ is situated in tetrahedral sites and Sr in octahedral sties. Doping trivalent rare earth into the $SrAl_2O_4$ lattice through substitution of $Sr^{2+}$ generates lattice defects associated with interstitial oxygen; these defects are known to be phosphorescence killers. Co-doping divalent ions, such as $Mg^{2+}$ or $Zn^{2+}$ to replace part of $Al^{3+}$, or co-doping monovalent alkali metal ions, such as $Na^+$ or $K^+$, to replace a portion of $Sr^{2+}$, eliminates these oxygen defects and improves the brightness of the phosphors.

Preferred phosphors of this invention are those having a $SrAl_2O_4$ matrix. A portion of the $Sr^{2+}$ in the matrix can, however, be replaced with $Ca^{2+}$, $Ba^{2+}$ or both without significant shift in emission wavelength.

The basic phosphors of this invention are most generally prepared by admixing the components in the following molar proportions:

$$(1-2x-2y)MCO_3 + Al_2O_3 + xEu_2O_3 + yR_2O_3 + zB_2O_3 \text{ (optional)}$$

and will have the general stoichiometric formula:

$$M_kAl_2O_4:2xEu^{2+}, 2yR^{3+} \qquad 2$$

where k=1-2x-2y, x is a number ranging from about 0.0001 to about 0.05 and is preferably about 0.005 to about 0.02, y can range from about 0.0001 to about 0.15 and is preferably equal to 2x. M is most generally an alkaline earth metal, but is preferably Sr or a mixture of Sr with Ca, Ba or both. R is generally one or more trivalent metal ions, but is preferably a trivalent metal ion selected from the group:$Pr^{3+}$, $Ho^{3+}$, $Nd^{3+}$, $Dy^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, $Yb^{3+}$ and $Bi^{3+}$. The preferred trivalent metal ion dopant is $Dy^{3+}$.

The combined phosphor components are milled or ground into a homogeneous fine powder, optionally pressed into pellets and prefired in air (or other oxygen-containing gas) for about 1 hr at about 600° C. The prefired material is remilled or ground into a fine powder for sintering. The powder is optionally pressed before sintering. The material is sintered at about 1300° C. for one hour in a reducing atmosphere. After the material is sintered it is cooled. The method of cooling employed determines if high temperature phase (β-phase material) or the lower temperature (α-phase material) is produced.

To form a high temperature phase material, the sintered material is optionally slowly cooled to an intermediate temperature: about 650° C. to about 750° C., preferably to about 700° C. and held at that temperature for a few minutes. This step minimizes thermal shock to equipment. The material is then rapidly quenched to room temperature. Through this quenching process at least part of the material remains in the high temperature phase at room temperature.

To form the low temperature phase material, the sintered material is slowly cooled to room temperature.

Quenched phosphors of formula $M_kAl_2O_4:2xEu^{2+}, 2yR^{3-}$ are generally improved in brightness and persistence compared to the analogous non-quenched phosphors. For example, phosphor-containing quenched $SrAl_2O_4:0.01Eu^{2+}$, $0.02Pr^{3+}$ exhibits a 50% improvement in brightness compares to the corresponding non-quenched material.

Phosphors of this invention include those in which two trivalent metal ions are doped into the matrix and have the general stoichiometric formula:

$$M_kAl_2O_4:2xEu^{2+}, 2y, R_1^{3-}, 2y_2R_2^{3+},$$

where k=1-2x-2y, $y_1+y_2=y$, $R_1$ and $R_2$ are at least two different trivalent metal ions, and M being defined above. Either $R_1$ or $R_2$ may represent a mixture of different trivalent metal ions. The number x can range from about 0.0001 to about 0.05 and is preferably about 0.005 to about 0.02, y can range from about 0.0001 to about 0.15 and is preferably equal to 2x. Phosphors in which $R_1$ is $Dy^{+3}$ and $R_2$ is $Y^{+3}$ are preferred. Phosphors of this formula include both quenched and non-quenched material.

The phosphors of this invention include those in which $Al^{3+}$ in the host is substituted by a divalent metal ion, particularly $Mg^{2+}$ or $Zn^{2+}$. These phosphors have the general formula:

$$M_kAl_{2-q}O_4 \cdot qXO: 2xEu^{2+}, 2yR^{3+},$$

where k=1-2x-2y, x can range from about 0.0001 to about 0.05 and is preferably about 0.005 to about 0.02, y can range from about 0.0001 to about 0.15 and is preferably equal to 2x. X is a divalent metal ion, preferably $Mg^{2+}$ or $Zn^{2+}$ and q can range from about equal to 0.0001 to about equal to 0.45. The amount of divalent ion (q) added to the matrix to replace $Al^{3+}$, is preferably about equal to the amount of $R^{+3}$ doped into the matrix (i.e., q preferably=2y). Phosphors of this formula include both quenched and non-quenched materials.

The phosphors of this invention include those in which $M^{2+}$ in the host is substituted by a monovalent metal ion, particularly $Na^+$ or $K^+$. These phosphors have the general formula:

$$M_kAl_2O_4 \cdot rZ_2O:2xEu^{2+}, 2yR^{3+},$$

where k=1-2x-2y-2r, x can range from about 0.0001 to about 0.05 and is preferably about 0.001 to about 0.005, y can range from about 0.0001 to about 0.15 and is preferably equal to 2x. Z is a monovalent alkali metal ion, preferably $Na^+$ or $K^+$, and r can range from about equal to or more than 0 to about 0.30. (The amount of monovalent ion (2r) added to the matrix to replace $M^{2+}$, is preferably about equal to the amount of $R^{+3}$ doped into the matrix (i.e., r preferably=y). Phosphors of this formula include both quenched and non-quenched material.

The phosphors of this invention can be prepared as powders or ceramics as indicated in the examples. Materials of this invention can be used to prepare single crystal phosphors as described in Example 5. In preparation of single crystal phosphors the addition of flux ($B_2O_3$ or boric acid) is optional. The quenching step discussed above is also optional when making single crystals or single crystal fibers.

Sintered phosphor material can be used to grow single crystals or single crystal fibers. Any crystallization technique can be employed. The laser heated pedestal method is preferred. Sintered pellets are cut into bars to introduction into the crystal growth chamber (1×1 mm/1.5'1.5 mm pieces). The bars are carefully cleaned prior to introduction into the chamber which is filled with an non-reactive or inert gas (e.g., $N_2$) or a somewhat reducing gas (<about 1% by volume $H_2$ in $N_2$). Care should be take to minimize or avoid reoxidation of $Eu^{2+}$ ions and to minimize or avoid reduction to the monovalent or zero valent (i.e., metal) state. Other metals in the materials preferably remain in the same oxidation state during crystallization. A pointed ceramic bar can be used as a "seed" to stimulate spontaneous nucleation in the LHPG process. It was observed that the initial part of the fiber prepared by the LHGP process was a twined crystal. the fiber eventually becomes one single crystal after a transition stage, but the crystal is not oriented. Fiber lengths of single crystals grown are variable, but can be as long as several centimeters in length. Single crystals with an average diameter of about 0.8 mm can be grown.

Transparent, greenish single crystal fibers of $SrAl_2O_4$:Eu, Dy were obtained from sintered phosphor prepared by combined components: 0.94 $SrCO_3$ (99.95%), $Al_2O_3$ (99.95%), 0.01$Eu_2O_3$ (99.9%), and 0.02 $Dy_2O_3$ (99.9%). Transparent, purplish single crystal fibers of $CaAl_2O_4$:Eu, Dy were obtained from sintered phosphor prepared by combined components: 1.05 $CaCO_3 + Al_2O_3 + 0.01$ $Eu_2O_3 + 0.02$ $Nd_2O_3$. Since the first crystalline phase obtained on cooling is $CaAl_4O_7$. To ensure that the crystal was $CaAl_2O_4$, 1.6% excess of $CaCO_3$ was added to the initial component mixture. It was found that incongruent melting was not a problem for crystal growth by the LHPG method and high quality crystals could be obtained from the stoichiometric melt. After the first phase $CaAl_4O_7$. is crystallized, the melt gradually becomes CaO rich, the composition changes to one where the first phase of $CaAl_2O_4$ is stable and $CaAl_2O_4$ starts to form.

For the preparation of $CaAl_2O_4$:$EU^{2+}$,$Dy^{2+}$ single crystal phosphors inclusion of an excess of $CaCO_3$ over the required molar proportions to obtain the desired stoichiometry is preferable to ensure formation of the $CaAl_2O_4$ phase, especially when growing single crystals by the Czochralski method. The excess is not necessary when growing single crystals by the floating zone or LHPG methods.

At low temperature the photoexcitation energy can be stored in the phosphor sample for a long time. For example, single crystal material $SrAl_2O_4$:$Eu^{2+}$, $Dy^{3+}$ irradiated at room temperature and kept at liquid nitrogen temperature (about −178° C.) for ten days, still exhibits bright after-glow after it is warmed back up to ambient temperature.

The phosphors of this invention in powder, ceramic or single crystal form have a variety of applications for the manufacture of luminous materials, including paints, inks, plastic articles, toys, jewelry, ornaments and apparel. The phosphors have application in night vision apparatus and in optoelectronic devices. The phosphors of this invention can for example be employed in detection of UV radiation and the manufacture of infrared detectors and beam finders.

More specifically this invention provides:

A. A phosphor material comprising a β-phase phosphor of formula:

$$M_kAl_2O_4:2xEu^{2+}, 2yR^{3+}$$

where:

M is an alkaline earth element selected from Sr, Ca, or Ba or combinations thereof;

k is 1-2x-2y;

x is a number ranging from about 0.0001 to about 0.05;

y can range from about 0.0001 to about 0.15; and $R^{3+}$ is one or more trivalent metal ions selected from the group $Pr^{3+}$, $Ho^{3+}$, $Nd^{3+}$, $Dy^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, $Yb^{3+}$ and $Bi^{3-}$.

Preferred phosphors of paragraph A are those with M=Sr and/or those wherein y=2x. Phosphor material of paragraph A includes phosphors in which $R^{3+}$ is a mixture of at least two trivalent rare earth metal ions and particularly those phosphors where $R^{3+}$ is a combination of $Dy^{3+}$ and $Y^{3+}$.

B. Phosphor materials of paragraph A which also contain up to about 2y moles of $Mg^{2+}$ substituted for $Al^{3+}$, up to about 2y moles of $Zn^{2+}$ substituted for $Al^{3+}$, up to about 2y moles of $Na^+$ substituted for $M^{2+}$, or up to about 2y moles of $K^+$ substituted for $M^{2-}$ in said formula.

C. Phosphor material having the general formula:

$$M_kAl_2O_4:2xEu^{2+}, 2yR^{3+}$$

where:

M is an alkaline earth element selected from Sr, Ca, or Ba or combinations thereof, k is 1-2x-2y;

x is a number ranging from about 0.0001 to about 0.05;

y can range from about 0.0001 to about 0.15;

$R^{3+}$ is one or more trivalent metal ions selected from the group $Pr^{3+}$, $Ho^{3+}$, $Nd^{3-}$, $Dy^{3+}$, $Er^{3+}$, $La^{3+}$, $Lu^{3+}$, $Ce^{3+}$, $Y^{3+}$, $Sm^{3+}$, $Gd^{3-}$, $Tb^{3+}$, $Tm^{3+}$, $Yb^{3+}$ and $Bi^{3+}$; and which also contains up to about 2y moles of a divalent metal $Mg^{2+}$ or $Zn^{2+}$ substituted for $Al^{3+}$ in the formula or up to about 2y moles of a monovalent alkali metal $Li^+$, $Na^+$, $K^+$, $Cs^+$ or $Rb^+$ substituted for $Sr^{2+}$ in the formula.

Preferred phosphor materials of paragraph C are those where the divalent or monovalent ion is present in the phosphor in an amount equal to that of $R^{3+}$. Preferred phosphors of paragraph C are those wherein $R^{3+}$ is $Dy^{3+}$ or a combination of $Dy^{3+}$ and $Y^{3+}$. phosphor material of claim 10 wherein said phosphor further comprises up to about 2y moles of $Mg^{2+}$ substituted for $Al^{3+}$ in said formula. Phosphor materials of paragraph C include phosphors further containing up to about 2y moles of $Zn^{2+}$, substituted for $Al^{3+}$, in the formula, up to about 2y moles of $Na^+$ substituted for $M^{2+}$, in the formula, up to about 2y moles of $K^+$ substituted for $M^{2+}$ in the formula.

D. A single crystal phosphor material containing a phosphor of the formula:

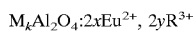

$$M_kAl_2O_4:2xEu^{2+}, 2yR^{3+}$$

where:
M is an alkaline earth element selected from Sr, Ca, or Ba or combinations thereof,
k is 1-2x-2y;
x is a number ranging from about 0.0001 to about 0.05;
y is a number ranging from about x to about 3x; and
$R^{3+}$ is one or more trivalent metal ions selected from the group $Pr^{3+}$, $Ho^{3-}$, $Nd^{3+}$, $Dy^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, $Yb^{3+}$, and $Bi^{3+}$.

Phosphor material of paragraph D also include those which contain up to about 2y moles of $Mg^{2+}$ substituted for $Al^{3+}$ in the formula, up to about 2y moles of $Zn^{2+}$ substituted for $Al^{3+}$, in the formula, up to about 2y moles of $Na^+$ substituted for $M^{2+}$ in the formula, or up to about 2y moles of $K^+$ substituted for $M^{2+}$ in the formula.

The invention specifically provides a method for making an improved phosphor which comprises the steps of:

a. combining phosphor components according to the equation:

$$(1-2x-2y)MCO_3+Al_2O_3+xEu_2O_3+yR_2O_3$$

where:
M is an alkaline earth element selected from Sr, Ca, or Ba or combinations thereof;
k is 1-2x-2y;
x is a number ranging from about 0.0001 to about 0.05;
y can range from about 0.0001 to about 0.15; and
$R^{3+}$ is one or more trivalent metal ions selected from the group $Pr^{3+}$, $Ho^{3+}$,
$Nd^{3+}$, $Dy^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, $Yb^{3+}$, and $Bi^{3+}$;

b. processing said combined components to produce a fine powder;

c. optionally pressing said fine powder into pellets;

d. prefiring said powder or pellets in an oxygen-containing gas for about 1 hour at a temperature of about 600° C;

e. processing said prefired material to produce a fine powder;

f. optionally pressing said fine powder into pellets;

g. sintering said powder or pellets of steps e or f at about 1300° C. for one hour in a reducing atmosphere;

h. quenching said sintered material to a temperature below 650° C. such that at least a portion of the material remains in the β-phase.

In this method, the sintered material is preferably quenched from the sintering temperature to a temperature below about 100° C. and conveniently is quenched to about room temperature. An optional intermediate cooling step can be applied to the sintered material to cool the material to an intermediate high temperature at or above the phase transition temperature of the material. The material is then quenched from the intermediate high temperature to a temperature below about 100° C. and conveniently is quenched to room temperature. The quenching step is preferably applied in general to rapidly cool the sintered material in a high temperature phase to a temperature substantially below the transition temperature between the high and low temperature phase such that at least a portion of the material is retained in the high temperature phase.

In the following examples, phosphor materials synthesized with a quenching step are designated β-phase materials and phosphor materials synthesized without a quenching step are designated α-phase materials.

EXAMPLES

Example 1

Preparation of Improved $SrAl_2O_4:Eu^{2+}$, $R^{3+}$ Green Phosphors

This method can be used to prepare all improved phosphors of host formula $MAl_2O_4$ activated with $Eu^{2+}$ and doped with a trivalent metal ion, e.g., a trivalent rare earth metal ion, or the Group VA trivalent Bi ions, where M is Sr or a mixture of Sr with Ca, Ba or both. The method also applies to the preparation of improved $MAl_2O_4$ host phosphors where $Zn^{2+}$ and $Mg^{2+}$ are substituted for $Al^{3+}$ as charge compensators into the host. The method applies as well to preparation of improved $MAl_2O_4$ host phosphors where $Na^+$ and $K^+$ are substituted for $Sr^{2+}$ or other $M^{2+}$, in the host matrix as charge compensators.

The phosphor components are combined according to the desired molar proportions, as will be discussed in more detail below. The resultant mixture is milled or ground into a homogeneous fine powder for prefiring. The powder is preferably pressed into pellets under 1.3 ton/cm² pressure. The powder or the pressed pellets are prefired at about 600° C. in air for about one hour. The prefired material is then pulverized and milled again into a fine powder suitable for sintering. Before sintering the powder can again be pressed into ceramic pellets under 1.3 ton/cm² pressure.

The powder or the pressed pellets are sintered at about 1,300° C. for about one hour in a $H_2$–$N_2$ flowing gas mixture (i.e., a reducing atmosphere) containing 2–5% $H_2$ by volume at a flow rate of about 0.1 liter per minute. The sample is then slowly cooled to a temperature between about 650° C. to about 750° C., preferably to 700° C., preferably at a rate of about 100° C. to about 500° C. per hour, and thereafter quickly quenched to room temperature by pulling the container entirely out of the furnace (air quenching). At least part of the $MAl_2O_4$ phosphor is believed to remain in its high temperature β-phase through this quenching process. The high temperature β-phase of $SrAl_2O_4$ is hexagonal in comparison to the lower temperature α-phase of $SrAl_2O_4$ which is monoclinic.

Example 2

Preparation of Low Temperature α-Phase $MAl_2O_4:Eu^{2+}$ Green Phosphors

This method can be used to prepare all low temperature phase phosphors of host formula $MAl_2O_4$ (where M is Sr or a mixture of Sr with Ba and/or Ca) doped with $Eu^{2+}$ as an emitter, and codoped with trivalent metal ions, including rare earth metal ions and Group VA $Bi^{3+}$. The method is exemplified for preparation of α-phase $SrAl_2O_4$ phosphors. This method also applies to the preparation of low-temperature phase $MAl_2O_4$ host phosphors where $Zn^{2+}$ and $Mg^{2+}$ are substituted for $Al^{3+}$ as charge compensators and to low temperature phase $MAl_2O_4$ host phosphors where $Na^+$ and $K^+$ are substituted for $Sr^{2+}$ as charge compensators.

The phosphor components are combined according to the desired molar proportions. The resultant mixture is milled or ground into a homogeneous fine powder for prefiring. The powder is preferably pressed into pellets under 1.3 ton/cm² pressure. The powder or the pressed pellets are prefired at about 600° C. to about 800° C. in air for about one to two hours. The prefired material is then pulverized and milled again into a fine powder suitable for sintering. Before sintering the powder can again be pressed into ceramic pellets under 1.3 ton/cm² pressure.

The powder or the pressed pellets are sintered at about 1,300° C. for about one to two hours in a $H_2-N_2$ flowing gas mixture containing 2–5% $H_2$ by volume at a flow rate of about 0.1 liter per minute. The sample is then cooled to room temperature at a rate of about 100° C. to about 500° C. per hour. α-$SrAl_2O_4$ phosphor is obtained through this process.

Example 3
Preparation of β-Phase $SrAl_2O_4$:Eu, R where R is a Trivalent Rare Earth Ion or $Bi^{3+}$ and Comparison with an Analogous α-Phase Phosphor For preparation of the β-phase green phosphors $SrAl_2O_4$:Eu, R components are mixed in the following molar proportions:

$$(1-2x-2y)SrCO_3+Al_2O_3+xEu_2O_3+yR_2O_3+zB_2O_3$$

where x=about 0.0001 to about 0.05;
y=x to 2x;
z=0 to 0.1;
R is a trivalent rare earth or $Bi^{3+}$; and
$B_2O_3$ optionally is used as a flux in this preparation and can be replaced with two molar equivalents of $H_3BO_3$.

The components are mixed and treated as indicated in Example 1 to obtain the β-phase phosphor.

The synthesis is exemplified by the synthesis of β-phase and α-phase $SrAl_2O_4$:0.01 Eu, 0.02Dy. Phosphor components were combined in the following molar proportions:

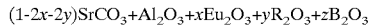
0.97 $SrCO_3$+$Al_2O_3$+0.005 $Eu_2O_3$+0.01 $Dy_2O_3$+0.1 $B_2O_3$

The mixture was divided into two parts. One part (labeled as α-SAO-ED for α-$SrAl_2O_4$) was processed as indicated in Example 2, and the other part (labeled as β-SAO-ED for β-$SrAl_2O_4$) was processed as indicated in Example 1.

Green phosphor prepared by the two different methods exhibited properties as indicated in Table 1. Table 1 provides after-glow intensity measurements of the β-phase material relative to the α-phase material (the reference).

Figure 2:
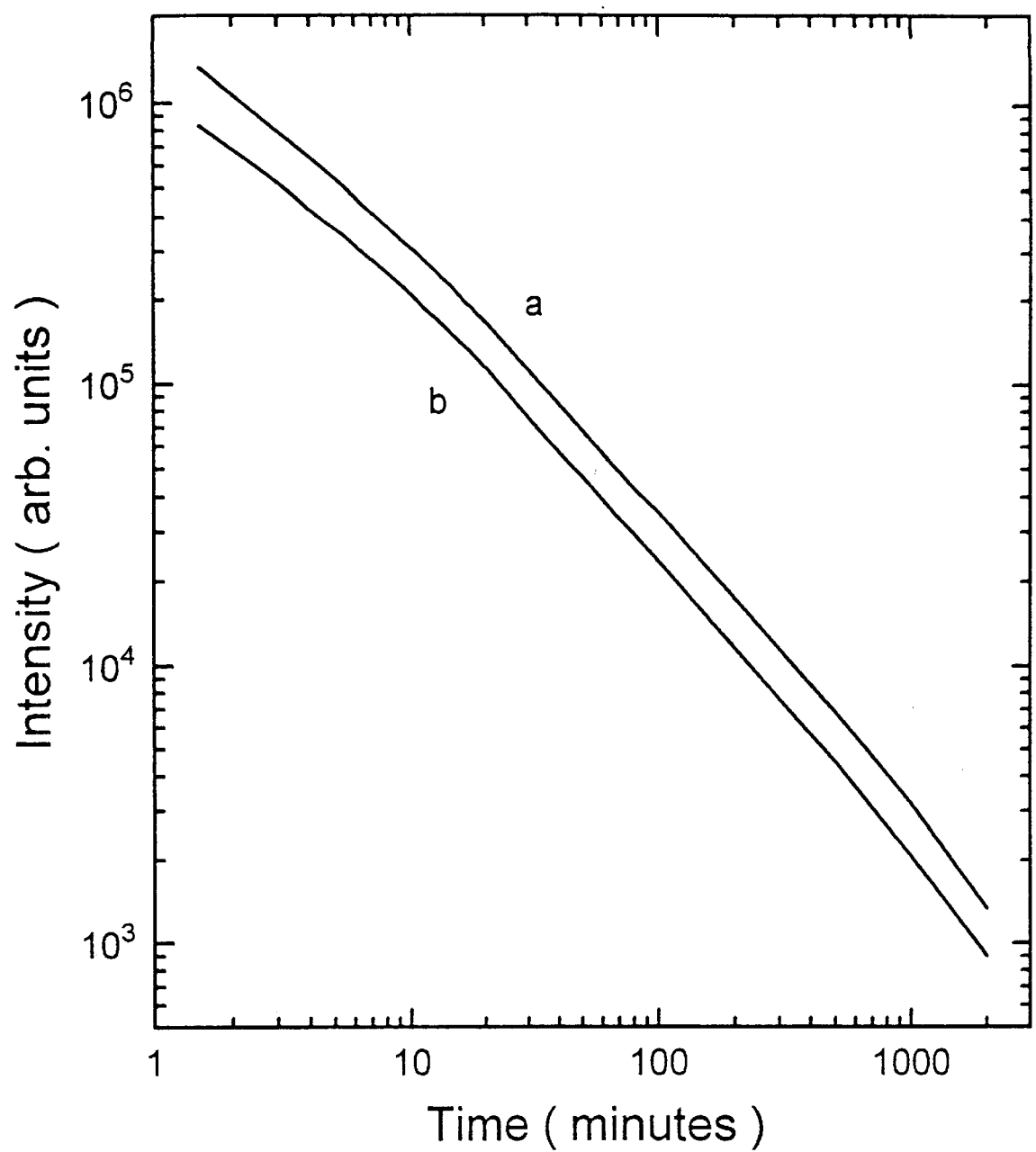
FIG. 2 is a graph of the decay curves of the afterglow of $\beta$-$SrAl_2O_4$:0.02 $Eu^{2+}$, 0.04 $Dy^{3+}$ (a) and the corresponding $\alpha$-phase material (b).

FIG. 1 illustrates the luminescent spectra of (a) β-$SrAl_2O_4$ phosphor (β-SAO-ED) and(b) α-$SrAl_2O_4$ (α-SAO-ED) 10 sec. after exposure to a 13 W fluorescent lamp. The luminescent spectrum of the β-phase is similar to that of α-phase, but shifted to the long wavelength side by about 3 nm. FIG. 2 shows decay curves of the after-glow of β-$SrAl_2O_4$:0.01$Eu^{2+}$0.02 $Dy^{3+}$ (a) and the corresponding α-phase material (b) (after exposure to a 13 W fluorescence lamp). It can be seen that the brightness of β-phase of the phosphor is about 50% better than that of α-phase.

TABLE 1

Comparison of phosphorescence between β-$SrAl_2O_4$ phosphor (β-SAO-ED) and α-$SrAl_2O_4$ (αSAO-ED), at indicated times after exposure to a 13 W fluorescent lamp.

| Sample: | Time (min) after | | | |
| --- | --- | --- | --- | --- |
| | 1 | 10 | 30 | 60 |
| α-SAO-ED | 100 | 100 | 100 | 100 |
| β-SAO-ED | 159 | 149 | 147 | 146 |

Example 4
Charge Compensation in α-$MAl_2O_4$:Eu, R Phosphors

In parts A–E of this example all samples are activated α-$SrAl_2O_4$. This example demonstrates that brightness in these phosphors can be improved by 40–100% by charge compensation. In each case, $B_2O_3$ is optionally added as a flux and can be substituted by an equivalent amount of boric acid. β-phase material can be prepared for each of these exemplified materials using processing as in Example 1.

A: Substitution of $Mg^{2+}$ for $Al^{3+}$ in $MAl_2O_4$:Eu, R

To make test sample SAO-ED-02Mg ($SrAl_2O_4$:0.01Eu:0.02Dy with 0.02 $Mg^{2+}$ (about 2 mol %) substituted for $Al^{3+}$, phosphor components are combined in the following molar proportions:

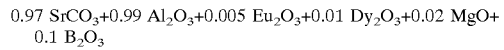
0.97 $SrCO_3$+0.99 $Al_2O_3$+0.005 $Eu_2O_3$+0.01 $Dy_2O_3$+0.02 MgO+ 0.1 $B_2O_3$ Reference sample: SAO-ED-A ($SrAl_2O_4$:0.01Eu:0.02Dy) without Mg was prepared by combining components in the following molar proportions:

0.97 $SrCO_3$+$Al_2O_3$+0.005 $Eu_2O_3$+0.01 $Dy_2O_3$+0.1 $B_2O_3$

Samples were prepared following the procedures of Example 2 to make α-phase phosphor.

Figure 3:
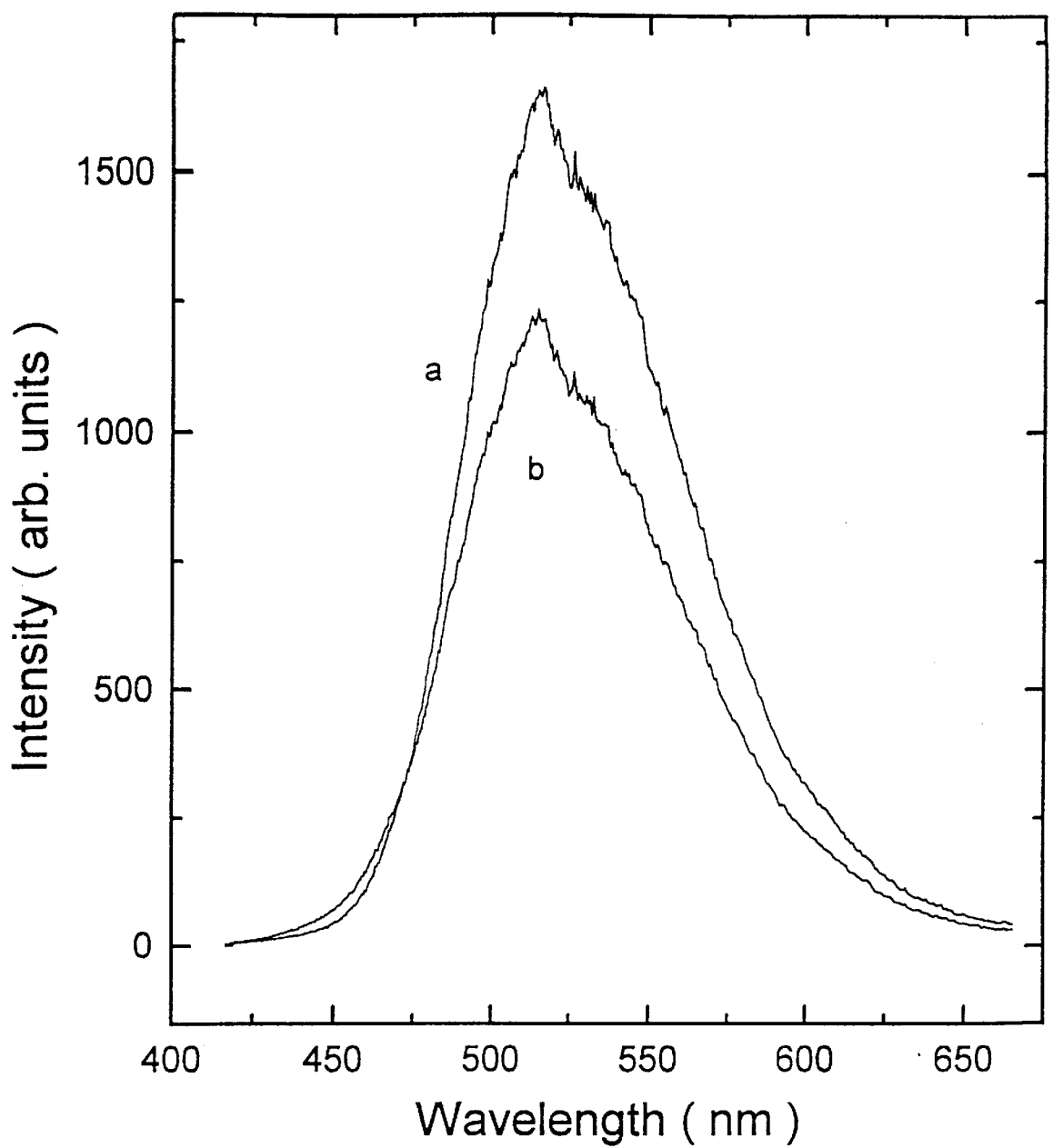
FIG. 3 illustrates the luminescence spectra of $SrAl_2O_4$:0.01 $Eu^{2+}$, 0.02 $Dy^{3+}$, (b) and the corresponding phosphor with 2 mol % $Mg^{2+}$ substituted for $Al^{3+}$ (a) 10 seconds after exposure to a 13 W fluorescent lamp.
Figure 4:
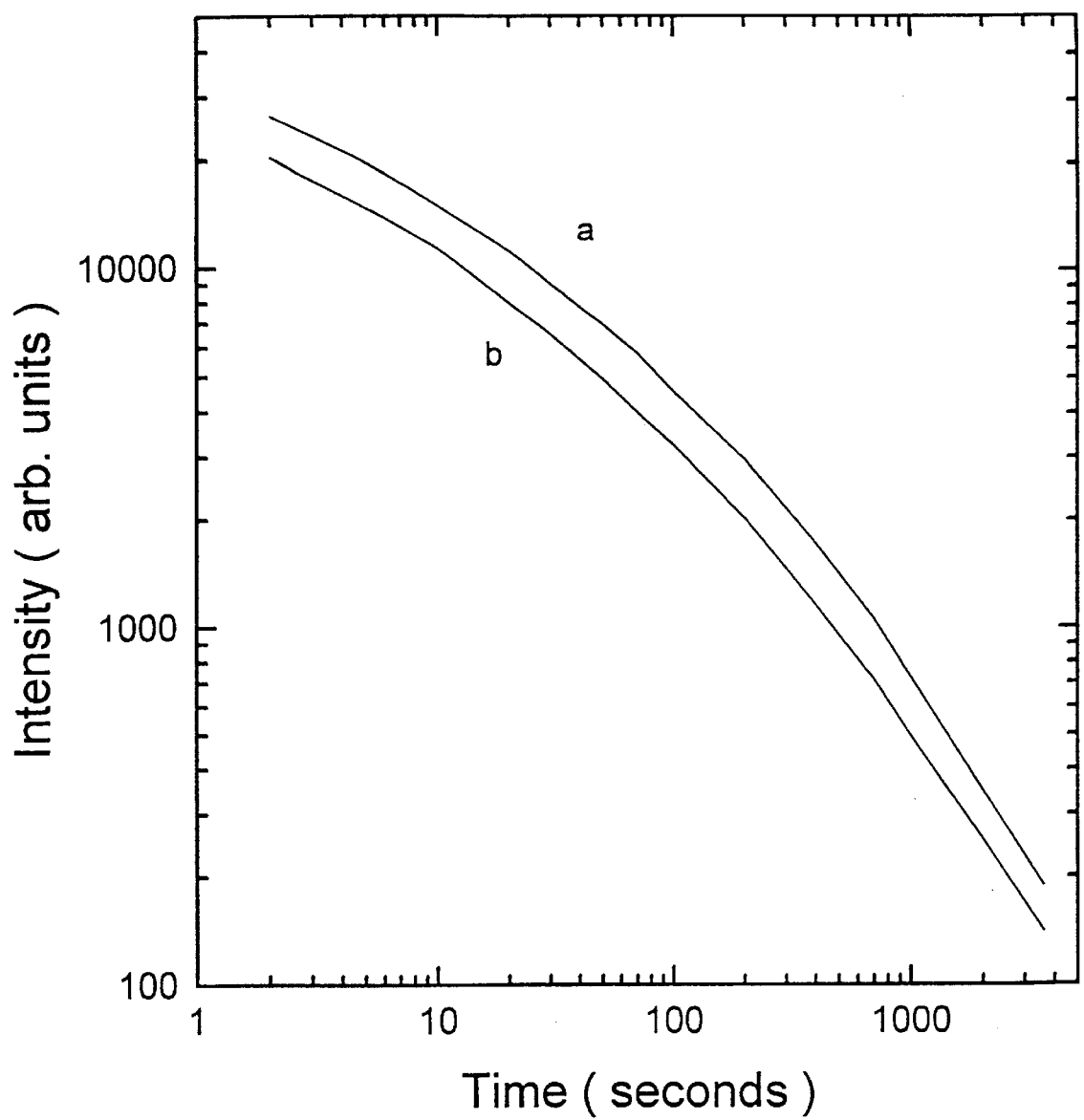
FIG. 4 is a graph of decay curves of the after-glow of $SrAl_2O_4$:0.01 $Eu^{2+}$, 0.02 $Dy^{3+}$ (b) and the corresponding phosphor with 2 mol % $Mg^{2+}$ substituted for $Al^{3+}$, (a).
Figure 5:
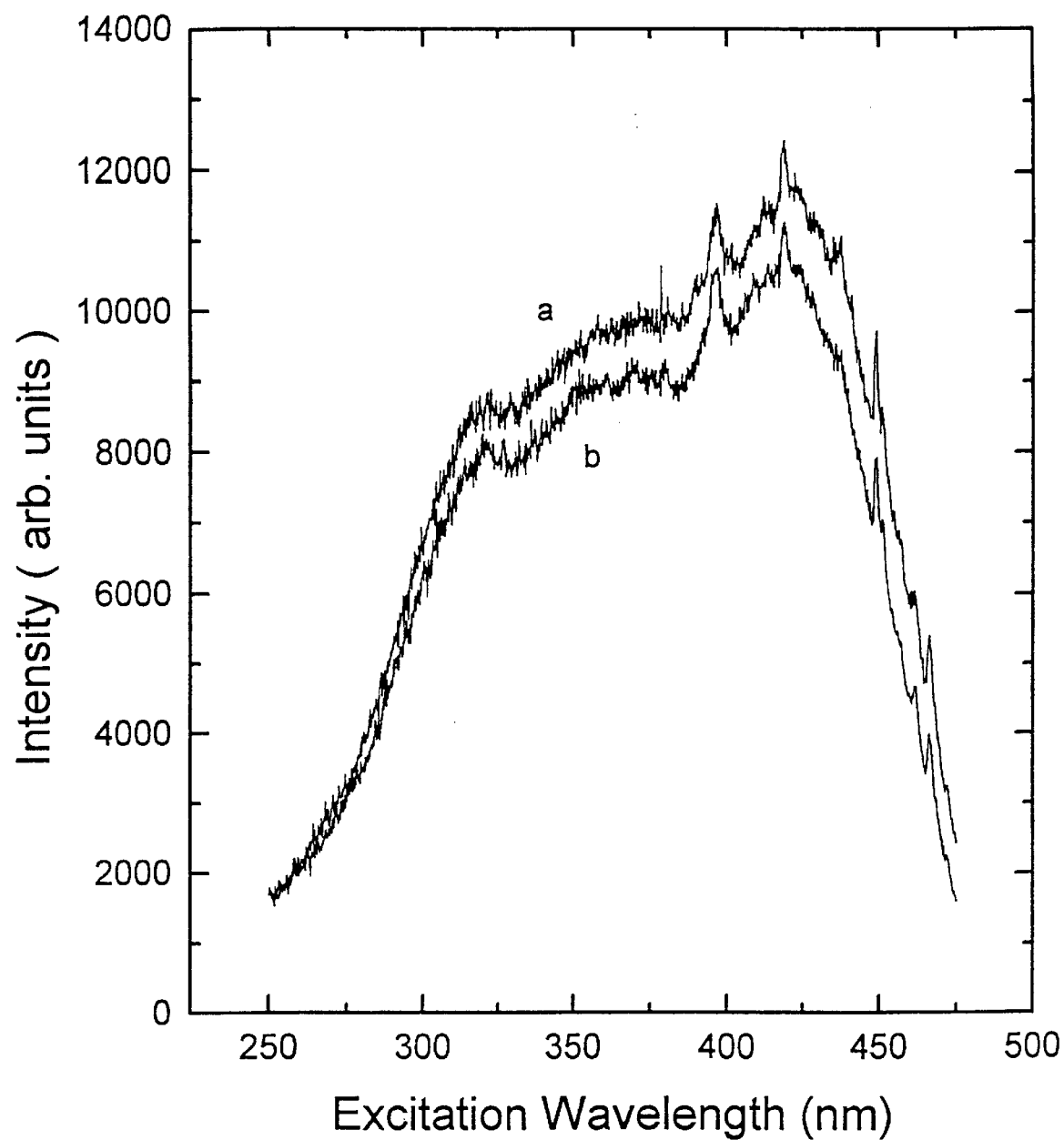
FIG. 5 illustrates the excitation spectra of samples of $SrAl_2O_4$:0.01 $Eu^{2+}$, 0.02 $Dy^{3+}$ (b) and the corresponding phosphor with 2 mol % $Mg^{2+}$ substituted for $Al^{3+}$.

FIG. 3 illustrates the luminescence spectra of $SrAl_2O_4$:0.01 $Eu^{2+}$:0.02$Dy^{3+}$ without (a) and with (b) $Mg^{2+}$ (0.02) doping at room temperature 10 sec after exposure to a 13 W fluorescence lamp. FIG. 4 is a graph of decay curves of the after-glow of $SrAl_2O_4$:0.01$EU^{2+}$:0.02$Dy^{3+}$ with (a) and without (b) $Mg^{2+}$ (0.02) doping in the first 60 minutes after exposed to a 13W fluorescence lamp. FIG. 5 illustrates the excitation spectra of the samples with (a) and without (b) $Mg^{2+}$ codoping, monitoring the emission at 490 nm. The brightness (intensity of luminescence) is increased by 40% in the sample doped with $Mg^{2+}$, which is believed to act as a charge compensator.

The general recipe for preparation of $MAl_2O_4$:Eu, R phosphors containing Mg or Zn is:

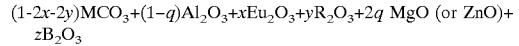
$(1-2x-2y)MCO_3+(1-q)Al_2O_3+xEu_2O_3+yR_2O_3+2q$ MgO (or ZnO)+ $zB_2O_3$ where:
x=0.0001 to 0.05;
y=x to 2x;
z=0 to 0.10;
q=0 to 2y and is preferably equal to y;
M is an alkaline earth metal, preferably Sr or a mixture of Sr with Ca, Ba, or with Ca and Ba; and
R is one or more trivalent metal ions selected from the group $Pr^{3+}$, $Ho^{3+}$, $Nd^{3+}$, $Dy^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, and $Yb^{3+}$ and trivalent $Bi^{3+}$.

B: Substitution of $Mg^{2+}$ for $Al^{3+}$ in $MAl_2O_4$:Eu, Dy

This example is used to show the improvement of phosphorescence by adding Mg (equal to the amount of Dy doped into the matrix) into phosphor samples which are doped with varying amounts of trivalent Dy. The samples were prepared in accordance to the following recipes:

Sample 1: ($SrAl_2O_4$,0.02Eu, 0.04 Dy) with 0.04 Mg (SAO-ED-04Mg) and without Mg (SAO-ED-B)

SAO-ED-04Mg:

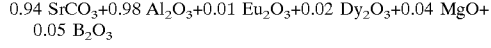

Reference: SAO-ED-B:

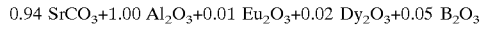

Sample 2: ($SrAl_2O_4$,0.02Eu, 0.08 Dy) with 0.08 Mg (SAO-ED-08Mg) and without Mg (SAO-ED-C)

SAO-ED-08 Mg:

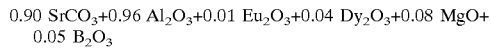

Reference: SAO-ED-C:

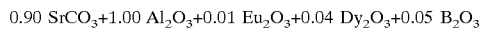

Sample 3: ($SrAl_2O_4$,0.02Eu, 0.12 Dy) with 0.12 Mg (SAO-ED-12Mg) and without Mg (SAO-ED-D)

SAO-ED-12 Mg:

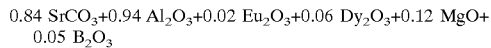

Reference: SAO-ED-D:

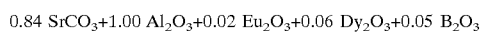

and treated following the procedure of example 2. The improvements in the phosphors are described by the ratio of the after-glow between each sample and the corresponding reference sample at specified times following exposure to a 4 W UV lamp. The results are in Table 2. It can be seen from the data of Table 2 that charge compensation tlrough codoping divalent ions (Mg or Zn) can greatly improve phosphor brightness. This is particularly true for phosphors in which a higher concentration of $R^{3+}$ (e.g., $Dy^{3+}$ or $Dy^{3+}$, in combination with $Y^{3+}$) is used. In general, co-doping of $Mn^{2+}/Zn^{2+}$ for $Al^{3-}$ or co-doping of $Na^+/K^+$ (or other monovalent alkali metal ions) for $M^{2+}$ becomes more important in the phosphors which are heavily doped with $R^{3+}$.

TABLE 2

Improvement of luminescence by adding $Mg^{2+}$ as a charge compensator into $SrAl_2O_4$:Eu, Dy samples

| after min | SAO-ED-02 Mg/ref | SAO-ED-04 Mg/ref | SAO-ED-08 Mg/ref | SAO-ED-12 Mg/ref |
|---|---|---|---|---|
| 1 | 1.43 | 1.49 | 1.55 | 1.82 |
| 10 | 1.45 | 1.45 | 1.44 | 1.39 |
| 30 | 1.33 | 1.40 | 1.47 | 1.18 |
| 60 | 1.21 | 1.20 | 1.00 | 1.11 |

C: Substitution of $Zn^{2+}$ for $Al^{3+}$ in $MAl_2O_4$:Eu, R

This example shows the improvement of phosphorescence by doping $Zn^{2+}$ into the phosphor as a charge compensator.

Samples were prepared by combining components in the following molar proportions:

Sample: ($SrAl_2O_4$:0.02Eu, 0.04Dy)
SAO-ED-04Zn with 0.04 ZnO

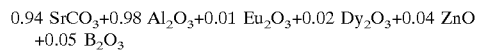

Reference: SAO-ED-E without ZnO

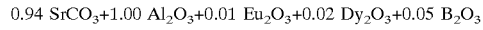

The samples were then prepared following the procedure of Example 2.

Figure 6:
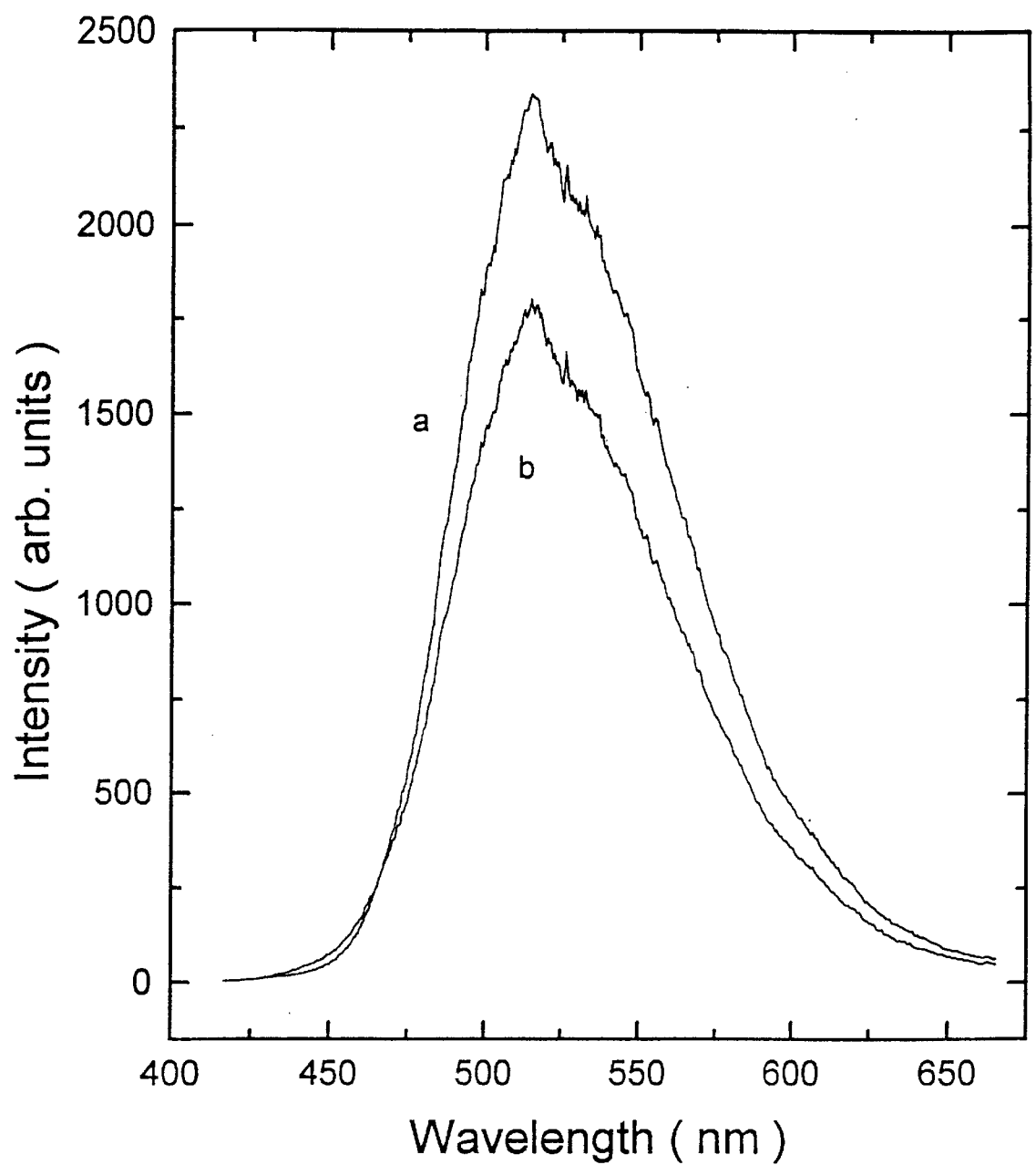
FIG. 6 illustrates luminescent spectra of $SrAl_2O_4$:0.02$Eu^{2+}$, 0.04$Dy^{3+}$ (b) and the corresponding phosphor with 4 mol % $Zn^{2+}$ substituted for $Al^{3+}$, (a).
Figure 7:
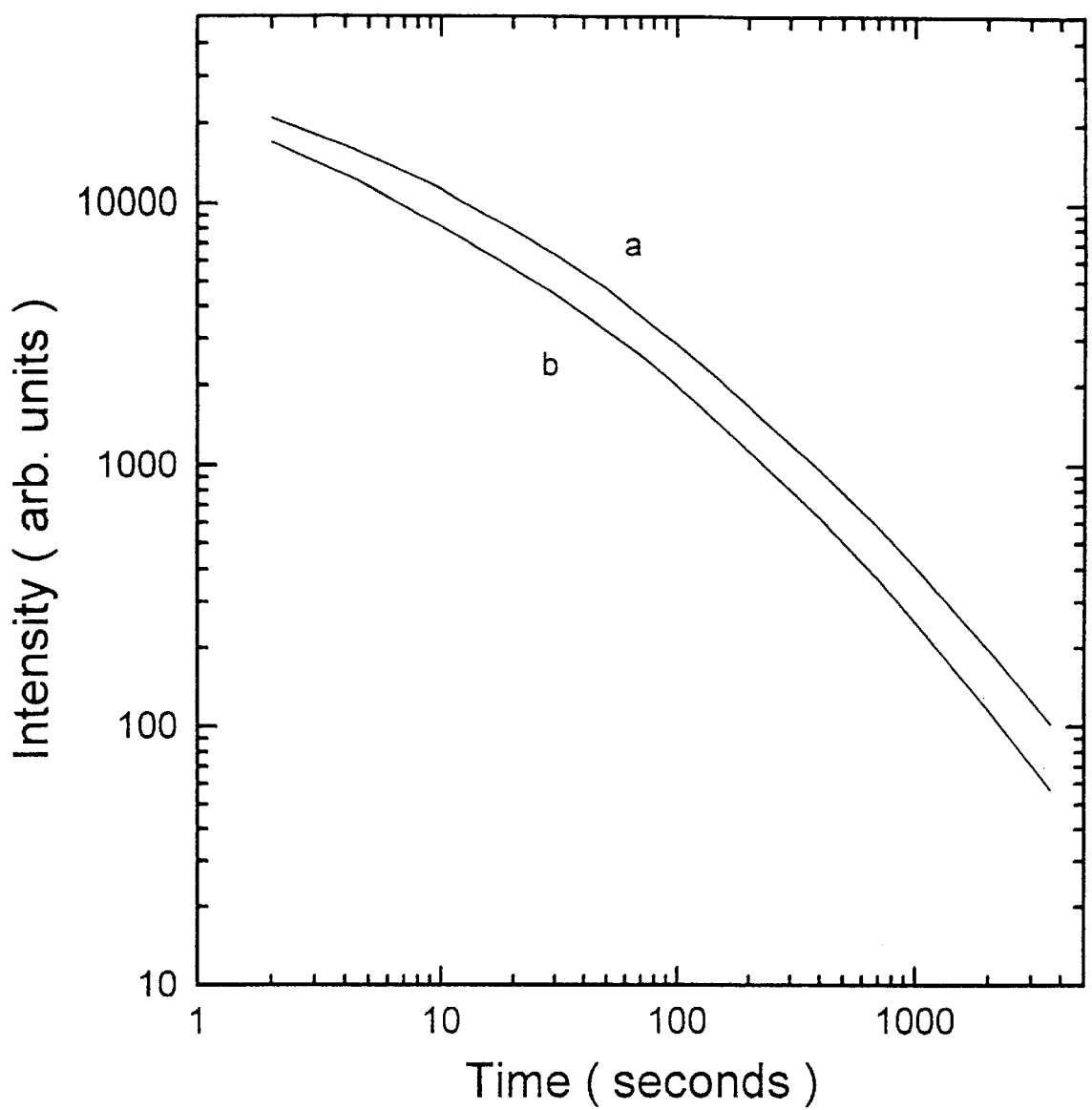
FIG. 7 is a graph of decay curves of the after-glow of $SrAl_2O_4$:0.02$Eu^{2+}$, 0.04$Dy^{3+}$ (b) and the corresponding phosphor with 4 mol % Zn substituted for $Al^{3+}$, in the first 60 minutes after exposure to a 13W fluorescent lamp.

FIG. 6 illustrates luminescence spectra of $SrAl_2O_4$:0.02Eu:0.04Dy with (a) and without (b) $Zn^{2+}$ (0.04) codoping 10 second after exposed to a 13 W fluorescence lamp. FIG. 7 is a graph of the decay curves of the after-glow of $SrAl_2O_4$:0.02$EU^{2+}$:0.04$Dy^{3+}$ with (a) and without (b) $Zn^{2+}$ (0.04) codoping in the first 60 minutes after exposed to a 13 W fluorescence lamp. Brightness is improved by up to 35% after codoping $Zn^{2+}$ into the phosphor.

D: Substitution of $Na^+$ for $Sr^{2+}$ in $MAl_2O_4$:Eu, Dy

This example demonstrates that monovalent sodium is effective in improving the phosphorescent intensity and persistence by acting as a charge compensator.

Samples are prepared by combining components in the following molar proportions:

with Na: SAO-ED-02Na

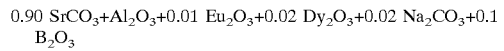

Reference sample without Na: SAO-ED

and following the procedures of Example 2.

Figure 8:
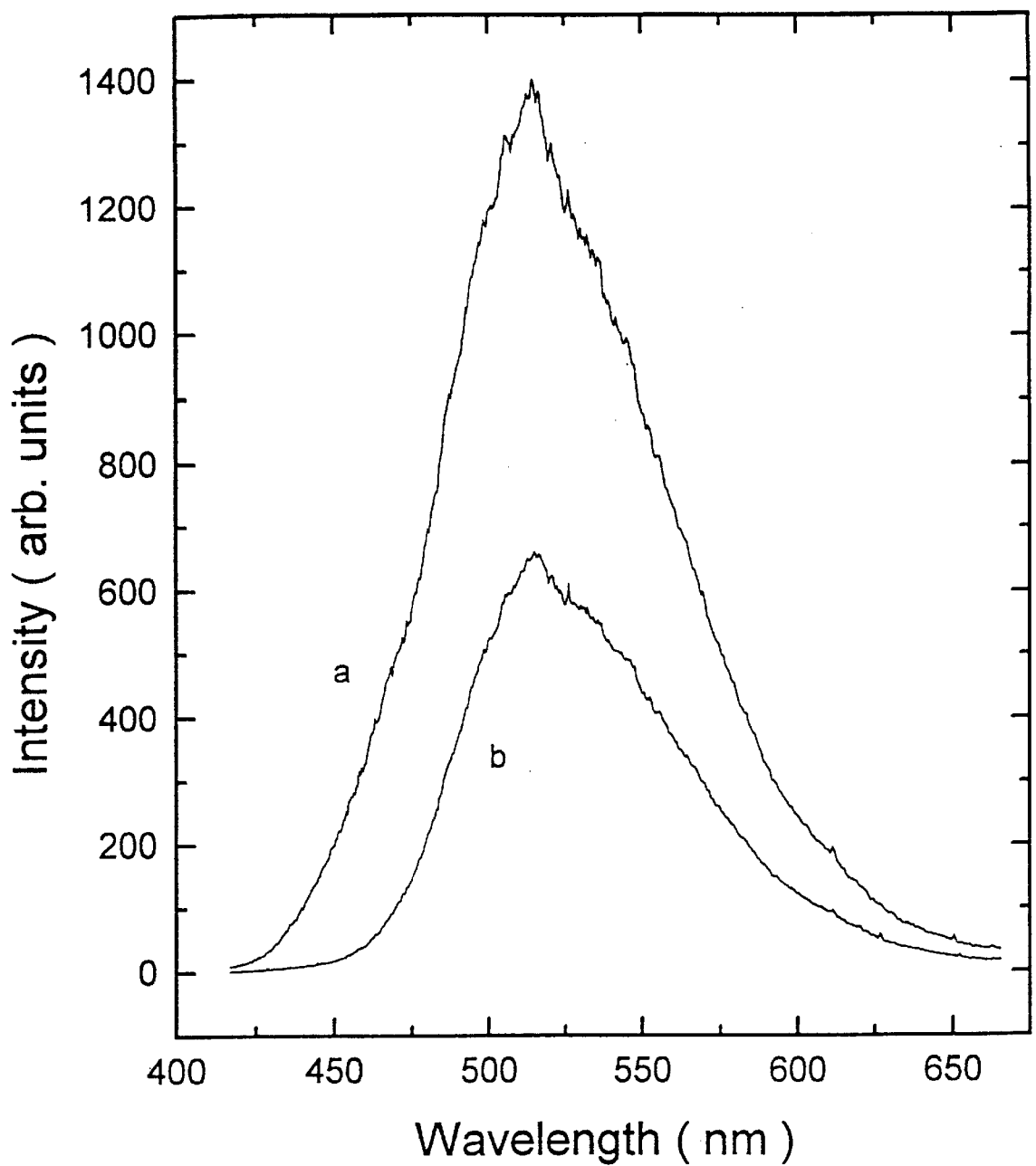
FIG. 8 illustrates luminescent spectra of the after-glow of $SrAl_2O_4$:0.02$Eu^{2+}$, 0.04$Dy^{3+}$ (b) and the corresponding phosphor with 4 mol % $Na^+$ substituted for $Sr^{2+}$ (a).
Figure 9:
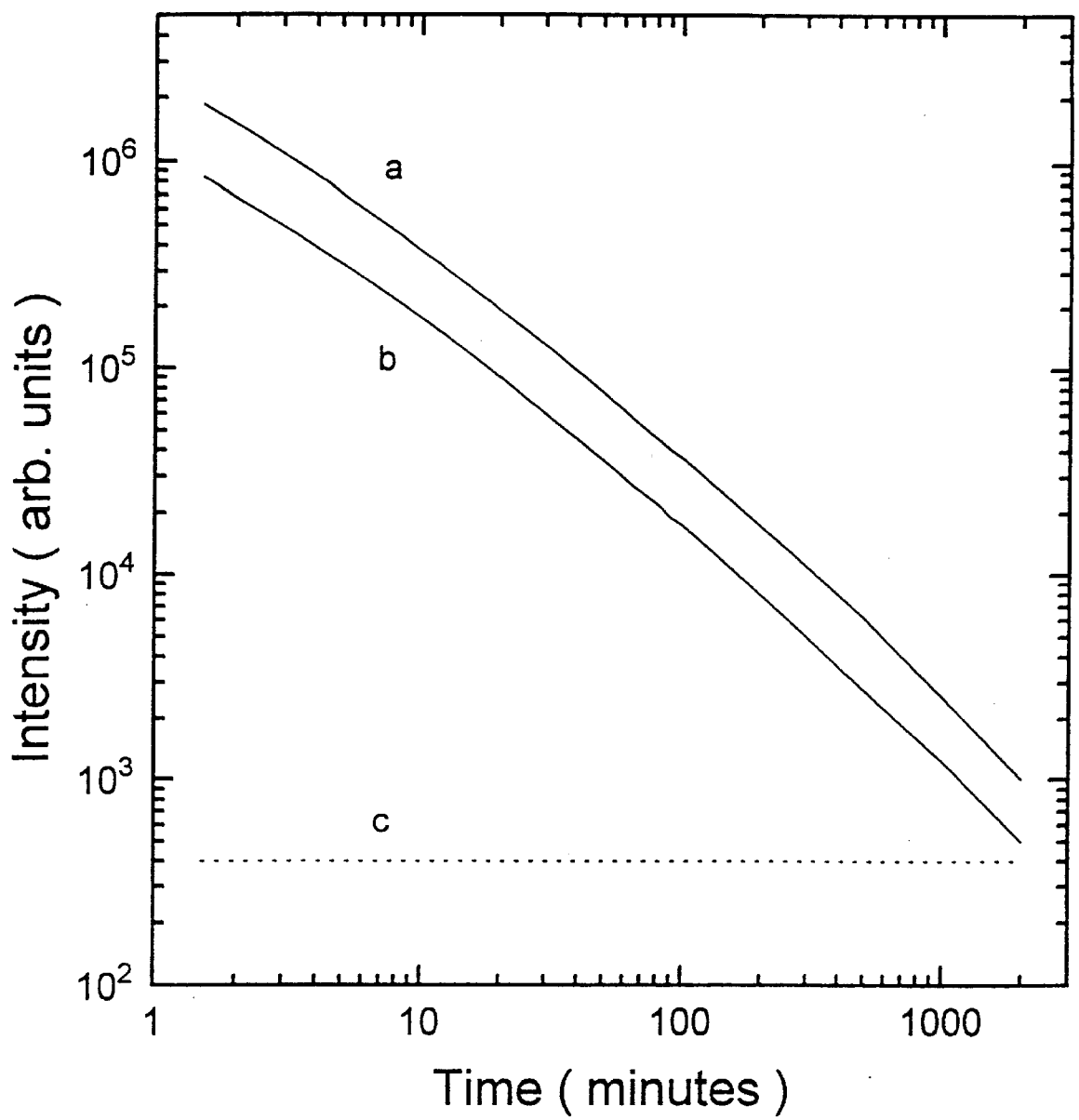
FIG. 9 is a graph of decay curves of the after-glow of $SrAl_2O_4$:0.02$Eu^{2+}$, 0.04$Dy^{3+}$ (b) and the corresponding phosphor with 4 mol % $Na^+$ substituted for $Sr^{2+}$.
Figure 10:
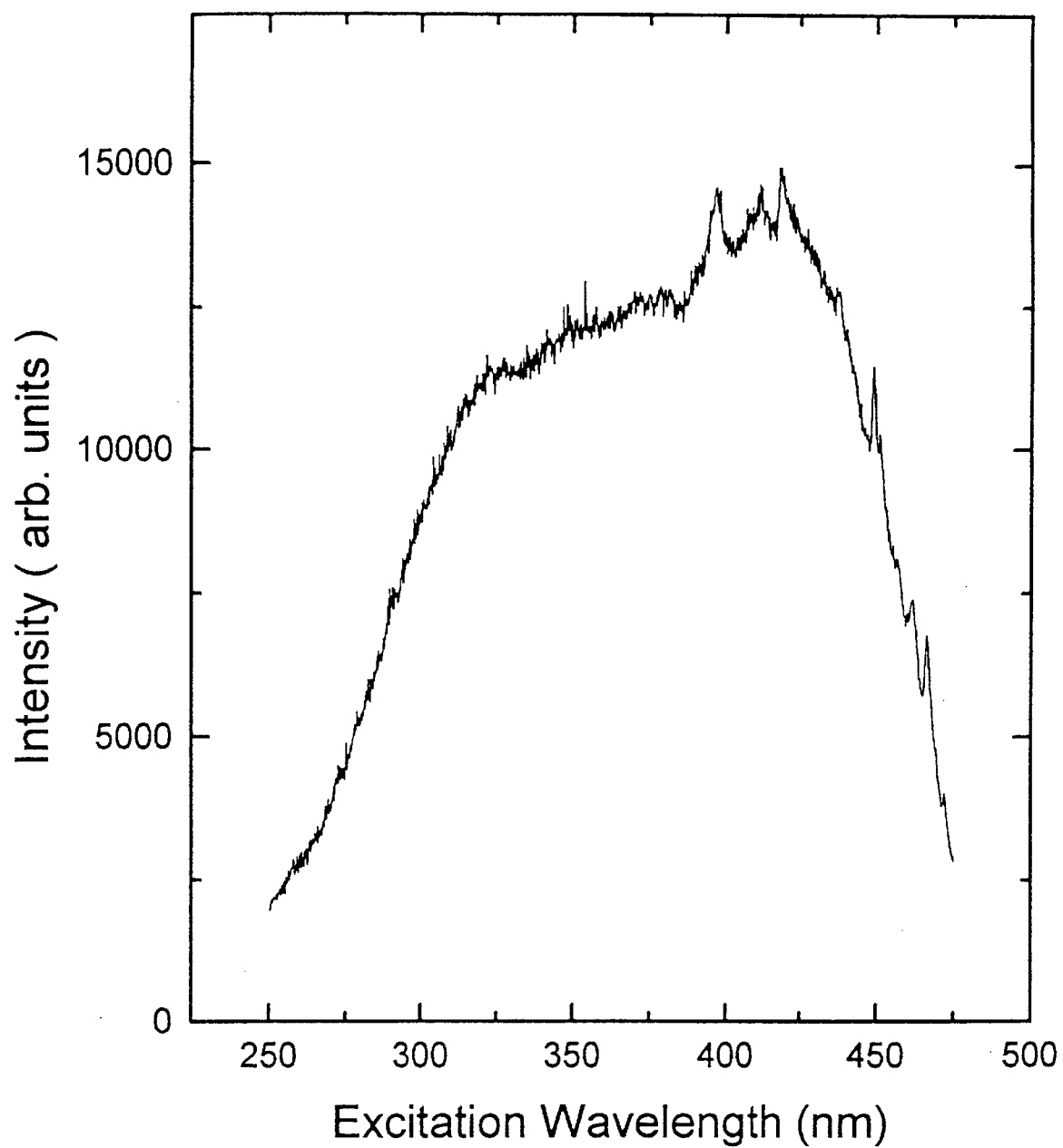
FIG. 10 illustrates the excitation spectrum of $SrAl_2O_4$:0.02$Eu^{2+}$, 0.04$Dy^{3+}$ with 4 mol % $Na^+$ substituted for $Sr^{2+}$ (monitoring at 520 mn).

FIG. 8 illustrates the spectra of the after-glow of the sample $SrAl_2O_4$:0.02Eu:0.04Dy with (a) and without (b) $Na^+$ (0.04) codoping, 10 second after exposed to a 4 W UV lamp. FIG. 9 is a graph of decay curves of the after-glow of the samples (a) with and (b) without $Na^+$ (0.04) codoping. The horizontal dashed line is the threshold of eye-sensitivity. FIG. 10 illustrates the excitation spectrum of $SrAl_2O_4$:0.02$Eu^{2+}$:0.04$Dy^{3+}$,0.04$Na^+$, monitoring the emission at 520 nm.

E: Co-Doping with $Dy^{3+}$ and $Y^{3+}$

This example is use to show the influence of trivalent yttrium ions on phosphorescence of the phosphor $SrAl_2O_4$:Eu,Dy.

Samples are prepared by combining components in the following molar proportions:

with $Y^{3+}$ SAO-ED-xY (SAO-ED-0.01Y, SAO-ED-0.02Y, and SAO-ED-0.03Y)

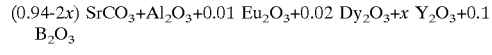

with x=0.01, 0.02 and 0.03;
without $Y^{3+}$: SAO-ED

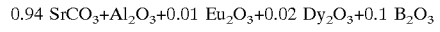

and treated as indicated in Example 2.

The results are shown in Table 3. It can be seen from the data of Table 3 that co-doping of $Y^{3+}$, can significantly improve the brightneess and persistence of the phosphors. The doping level of $Y^{3+}$, can be several times higher than that of $Dy^{3+}$.

TABLE 3

The influence of trivalent yltrium on the phosphorescence of $SrAl_2O_4:0.01Eu:0.02$ Dy

| After (min) | SAO-ED ref. | SAO-ED-0.02 Y | SAO-ED-0.01 Y | SAO-ED-0.03 Y |
|---|---|---|---|---|
| 1  | 100 | 133 | 112 | 246 |
| 10 | 100 | 139 | 124 | 264 |
| 30 | 100 | 133 | 121 | 262 |
| 60 | 100 | 154 | 123 | 279 |

Example 5
Preparation of Single Crystal Phosphors of General Formula $MAl_2O_4:Eu^{2+}$, $R^{3+}$ Crystals of alkaline earth aluminates can be grown directly from a melt by the Czockraski method (J. Czochralski (1918) Z. Phys. Chem. 92:219) the floating zone method (W. G. Pfann (1952) Trans. AIME 194:747) or the laser heated pedestal growth method (B. M Tissue et al. (1991) J. Crystal Growth 109:323 and W. M. Yen (1995) "Preparation of single crystal fibers," in *Insulating Materials for Optoelectronics*, (F. Agullo-Lopez, ed.) World Scientific, Singapore, Chapter 2. p.77. The exemplified crystals were grown using the laser heated pedestal growth method. The following general method was employed in all cases:

The phosphor components are mixed in molar proportions as desired to achieve a given phosphor. The addition of flux in the synthesis of single crystal phosphors is optional.

The mixed phosphor components are milled or ground into a homogeneous fine powder. The powder is then pressed into pellets under 1.3 ton/cm² pressure. Pellets are prefired at about 600° C. in air for about one hour. The prefired material is pulverized and milled into a fine powder and the powder is again pressed into pellets. The pellets are then sintered at about 1300° C. for one hour in a flowing $H_2$–$N_2$ gas flow having 2–5% (by volume) $H_2$ using a flow rate of about 0.1 liter/min. The gas flow is required to ensure that the Eu ions are reduced to the divalent state, while other ions in the mixture remain in their original valence state. The sintered pellets are cooled down to room temperature at a rate of about 100° C. to about 500° C. per hour.

Cooled sintered pellets are cut into thin bars of cross-section 1 mm×1 mm. The bars are carefully cleaned using a solvent (such as an alcohol or acetone) before introduction into the growth chamber.

The crystal growth chamber is filled with inert gas (alone or mixed with <1% $H_2$) at a pressure of 1 atm. during the entire period of heating, melting and growing of crystals. The atmosphere used in the following specific examples was 99.99% $N_2$. The atmosphere of the growth chamber is selected so that europium is maintained in the 2+ valence state.

The pulling speed of crystal growth employed was in the range of about 1 to about 5 mm/min.

It is believed that α-phase material is obtained through this procedure.

A. Green Phosphorescent Single Crystals of $SrAl_2O_4:Eu^{2+}$, $Dy^{3+}$

In general $SrAl_2O_4:Eu^{2+}$, $Dy^{3+}$ phosphors are prepared by combining components as follows:

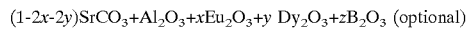
(1-2x-2y)SrCO₃+Al₂O₃+xEu₂O₃+y Dy₂O₃+zB₂O₃ (optional)

and following the general procedure above to form single crystals.

$SrAl_2O_4:0.02$ $Eu^{2+}$, $0.04Dy^{3+}$ single crystals were formed by combining the following components: 0.94SrCO₃+ Al₂O₃+0.01Eu₂O₃+0.02Dy₂O₃

Figure 11:
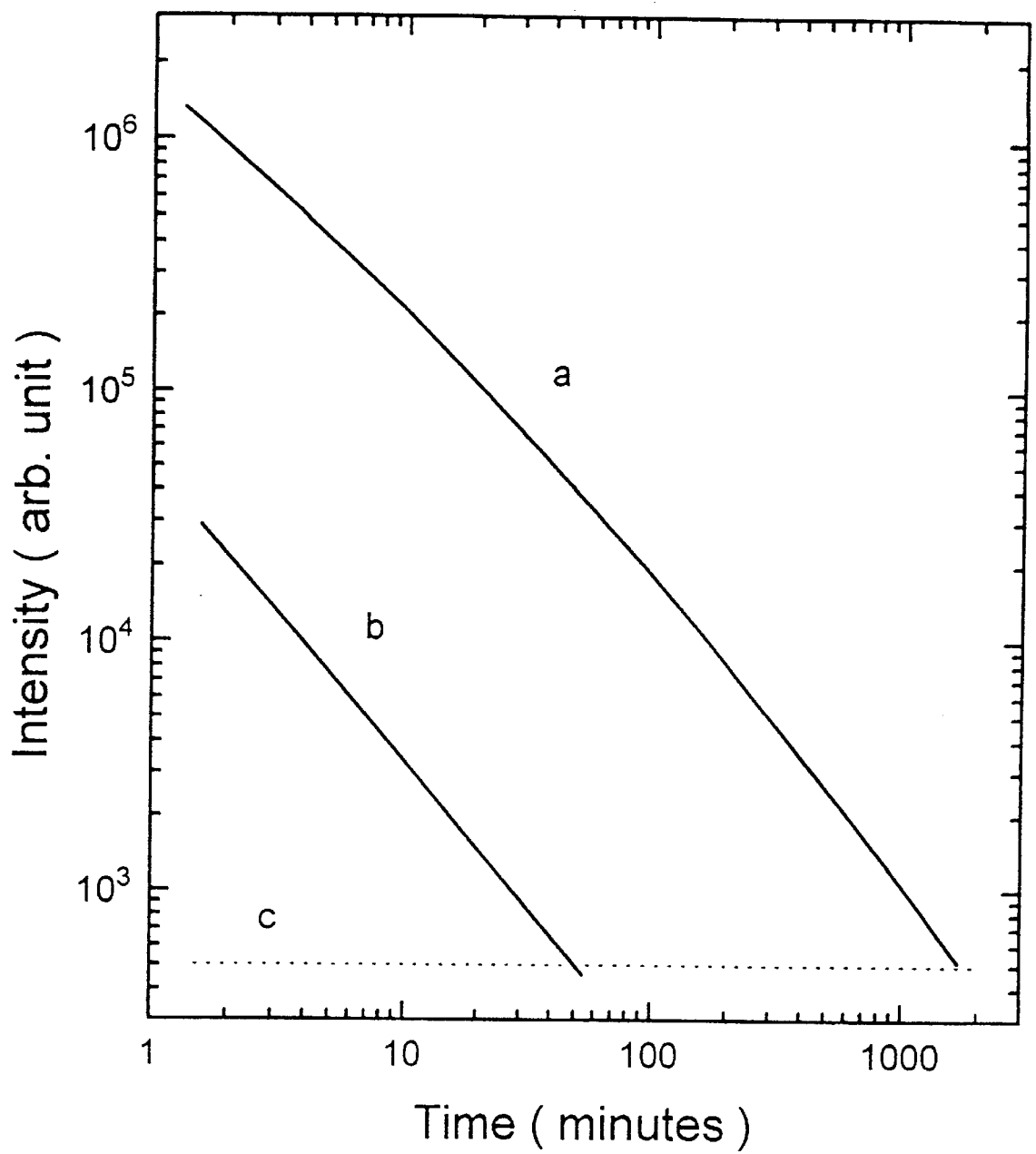
FIG. 11 is a graph of the decay characteristics of the phosphorescence of the single crystal (a) after exposure to a 13 W fluorescent lamp. The decay curve of a commercial green phosphor ZnS:Cu (b) is also shown and the threshold of eye-sensitivity is indicated (c).

The mixture was processed by the laser heated pedestal growth method as described above. The after-glow spectrum of the single crystal, after exposure to a 4 W UV lamp for 2 min, shows a broad band peaking at 520 nm with a bandwidth of 80 nm. FIG. 11 is a graph of the decay characteristics of the phosphorescence of the crystal (a) after exposure to a 13 W fluorescent lamp. The decay curve of a commercial green phosphor ZnS:Cu (b) is also shown. The persistence time of the phosphorescence of the crystal is longer than 16 hours.

Samples mixed with 0.05 $B_2O_3$ (z=0.05) were also prepared and exhibited similar phosphor properties.

B: Single crystals of $SrAl_2O_4:Eu^{2+}$, $Dy^{3+}$ with $Al^{3+}$ substituted by $Mg^{2+}$ or $Zn^{2+}$ In general, $Sr_kAl_{2(1-q)}0.2q$ $XO:2xEu^{2+}$, $2y$ $Dy^{3+}$ phosphors, where k=1-2x-2y and X is a divalent metal ion, particularly $Mg^{2+}$ or $Zn^{2+}$, are prepared by combining components as follows:

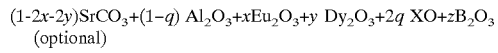
(1-2x-2y)SrCO₃+(1-q) Al₂O₃+xEu₂O₃+y Dy₂O₃+2q XO+zB₂O₃ (optional)

and following the general procedure above to form single crystals.

Single crystals of $SrAl_2O_4:0.02$ $Eu^{2+}$, $0.04Dy^{3+}$ with $Mg^{2+}$ substituted for $Al^{3+}$ were formed by combining the following components:

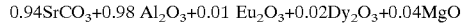
0.94SrCO₃+0.98 Al₂O₃+0.01 Eu₂O₃+0.02Dy₂O₃+0.04MgO

Figure 12:
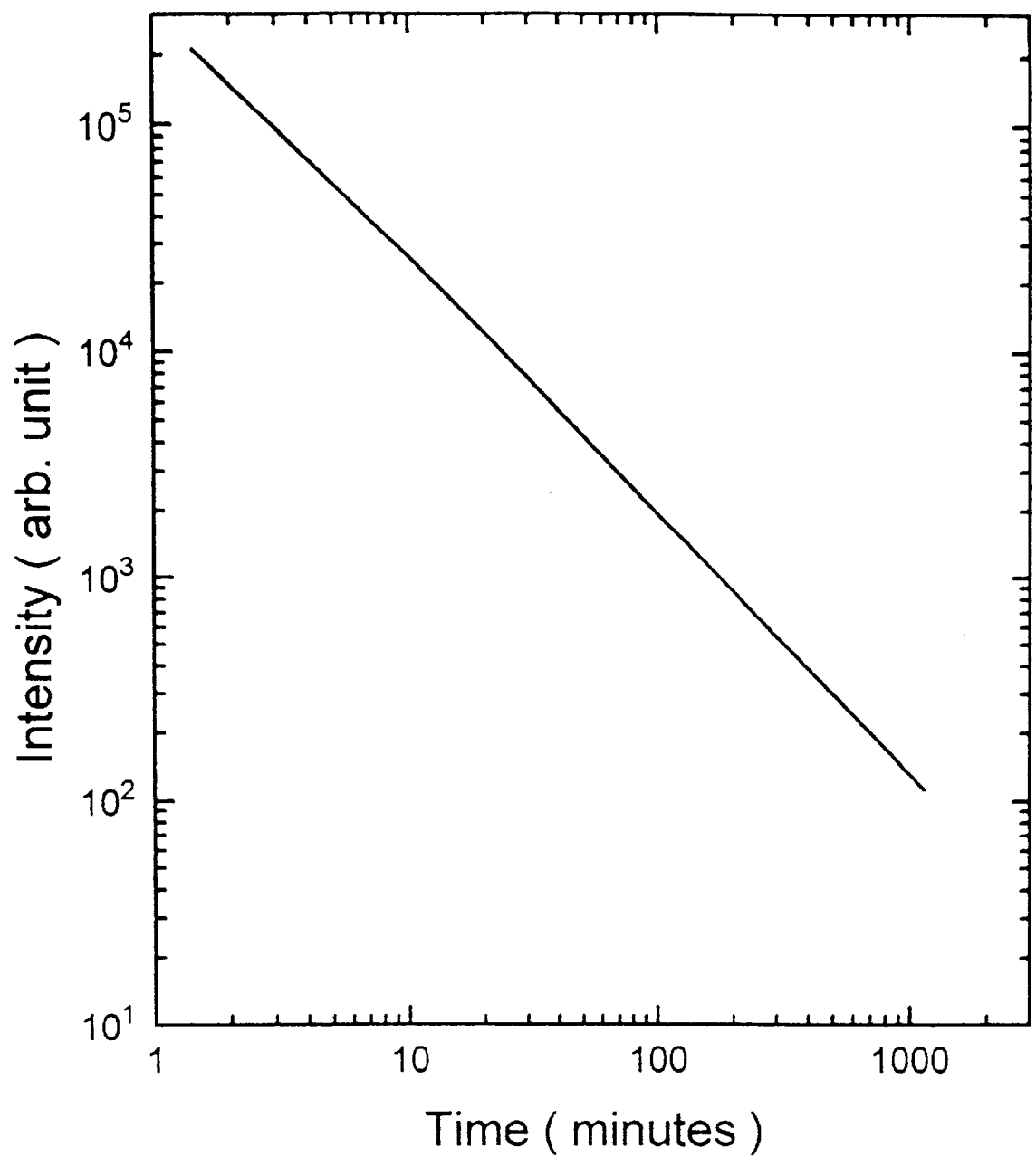
FIG. 12 is a graph of the decay characteristics of the phosphorescence of the single crystal $SrAl_2O_4$:0.02 $Eu^{2+}$, 0.04$Dy^{3+}$ with 4 mol % $Mg^{2+}$ substituted for $Al^{3+}$ after exposure to a 13 W fluorescent lamp.

The mixture was processed by the laser heated pedestal growth method as described above. The after-glow spectrum of the single crystal, after exposure to a 4 W LWV lamp for 2 min, shows a broad band peaking at 520 nm with a bandwidth of 80 nm. FIG. 12 is a graph of the decay characteristics of the phosphorescence of the crystal (a) after exposure to a 13 W fluorescent lamp.

Samples in which ZnO replaced MgO were also prepared which exhibited similar phosphorescent properties.

C: Single crystals of $SrAl_2O_4:Eu^{2+}$, $Dy^{3+}$ with $Sr^{2+}$ substituted by $Na^+$ or $K^+$ In general $Sr_kAl_2O_4 \cdot rZ_2O:2xEu^{2+}Eu^{2+}$, $2y$ $Dy^{3+}$ phosphors, where k=1-2x-2y-2r and Z is a monovalent metal ion, particularly $Na^+$ or $K^+$, are prepared by combining components as follows:

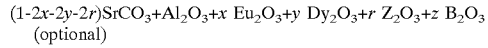
(1-2x-2y-2r)SrCO₃+Al₂O₃+x Eu₂O₃+y Dy₂O₃+r Z₂O₃+z B₂O₃ (optional)

and following the general procedure above to form single crystals.

Single crystals of $SrAl_2O_4:0.02$ $Eu^{2+}$, $0.04Dy^{3+}$ with $Na^+$ substituted for $Sr^{2+}$ were formed by combining the following components:

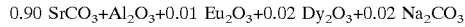
0.90 SrCO₃+Al₂O₃+0.01 Eu₂O₃+0.02 Dy₂O₃+0.02 Na₂CO₃

Figure 13:
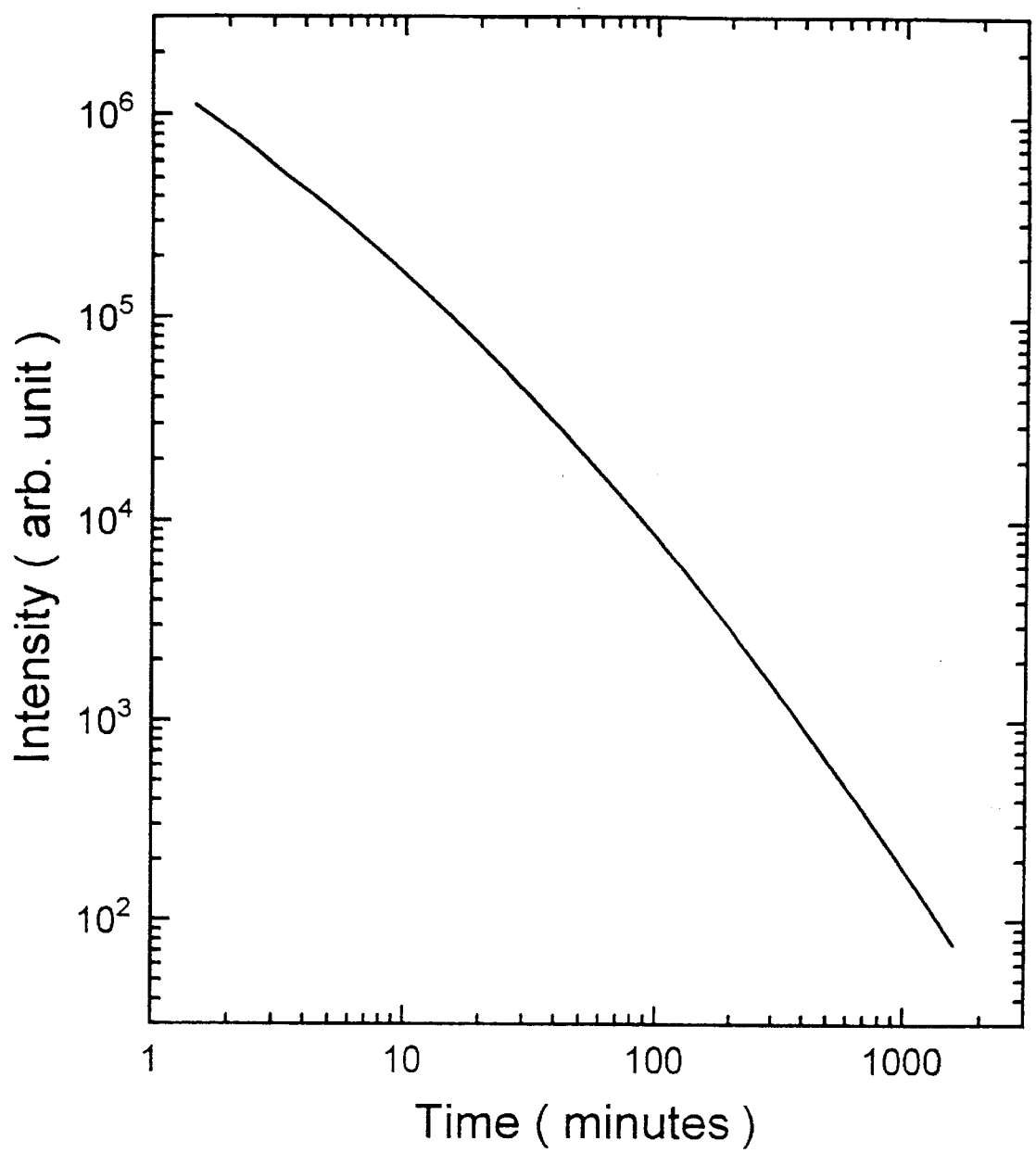
FIG. 13 is a graph of the decay characteristics of the phosphorescence of the single crystal $SrAl_2O_4$:0.01 $Eu^{2+}$, 0.04$Dy^{3+}$ with 4 mol % $Na^+$ substituted for $Sr^{2+}$ after exposure to a 13 W fluorescent lamp.

The mixture was processed by the laser heated pedestal growth method as described above. The after-glow spectrum of the single crystal, after exposure to a 4 W UV lamp for 2 min, shows a broad band peaking at 520 nm with a bandwidth of 80 nm. FIG. 13 is a graph of the decay characteristics of the phosphorescence of the crystal (a) after exposure to a 13 W fluorescent lamp.

Single crystal phosphors with similar properties can be prepared by replacing $Na_2CO_3$ with $K_2CO_3$.

D: Single crystal fibers of $CaAl_2O_4:Eu^{2+}, Nd^{3+}$

In general $CaAl_2O_4:Eu^{2+}, Nd^{3+}$ phosphors are prepared by combining components as follows:

$$(1+t) \, CaCO_3 + Al_2O_3 + x \, Eu_2O_3 + y \, Dy_2O_3 + z \, B_2O_3 \text{ (optional)}$$

where t represents an excess amount of $CaCO_3$ added to ensure obtaining the $CaAl_2O_4$ phase. No excess $CaCO_3$ needs to be added when preparing single crystals by the laser heated pedestal or floating zone methods. The mixture is processed by the general procedure above to form single crystals.

Phosphorescent purple single crystal fibers of $CaAl_2O_4:0.01 \, Eu^{2+}, 0.01 \, Nd^{3+}$ were prepared by combining components in the following molar proportions:

$$1.05 \, CaCO_3 \text{ (excess)} + Al_2O_3 + 0.005 \, Eu_2O_3 + 0.005 \, Nd_2O_3$$

and following the procedures described above.

Figure 14:
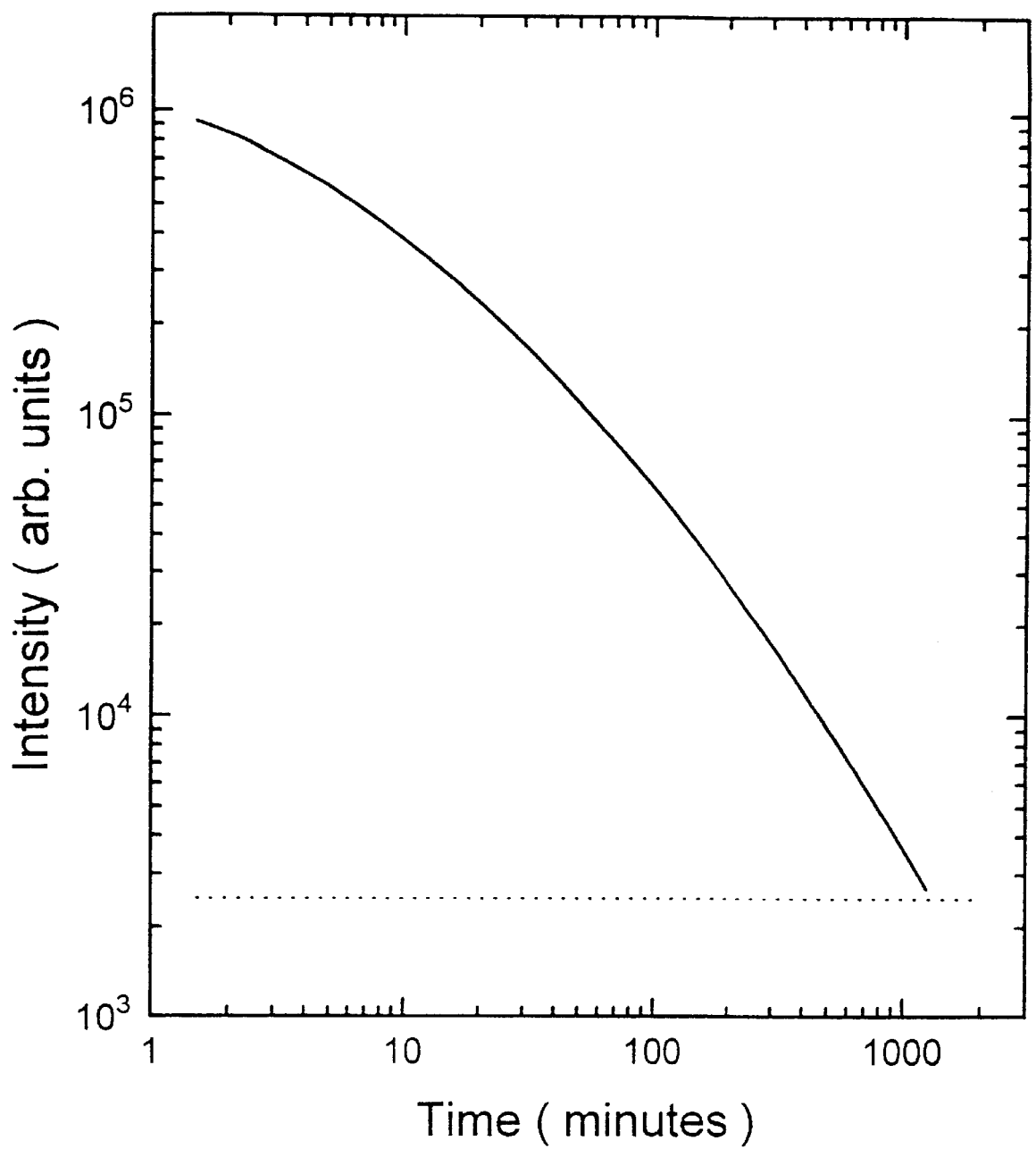
FIG. 14 is a graph of the decay characteristics of the phosphorescence of the single crystal $CaAl_2O_4$:0.01 $Eu^{2+}$, 0.01 $Nd^{3+}$ after exposure to a 13 W fluorescent lamp. The threshold of eye-sensitivity is indicated (dashed line).

The after-glow spectrum of the single crystal, after exposure to a 4 W UV lamp for 2 min, shows a broad band peaking at 444 nm with a bandwidth of 50 nm. FIG. 14 is a graph of the decay characteristics of the phosphorescence of the crystal (a) after exposure to a 13 W fluorescent lamp. The persistence time of the phosphorescence of the crustal is longer than 16 hours.

Single crystals of $CaAl_2O_4:Eu^{2+}, Nd^{3+}$ with $Mg^{2+}$ (substituted for $Al^{3+}$ in the matrix were also synthesized and they exhibited similar phosphorescent properties.

E: Mixed-single-crystal fibers of $Sr_{1-n}Ba_nAl_2O_4:Eu^{2+}, Dy^{3+}$

Figure 15:
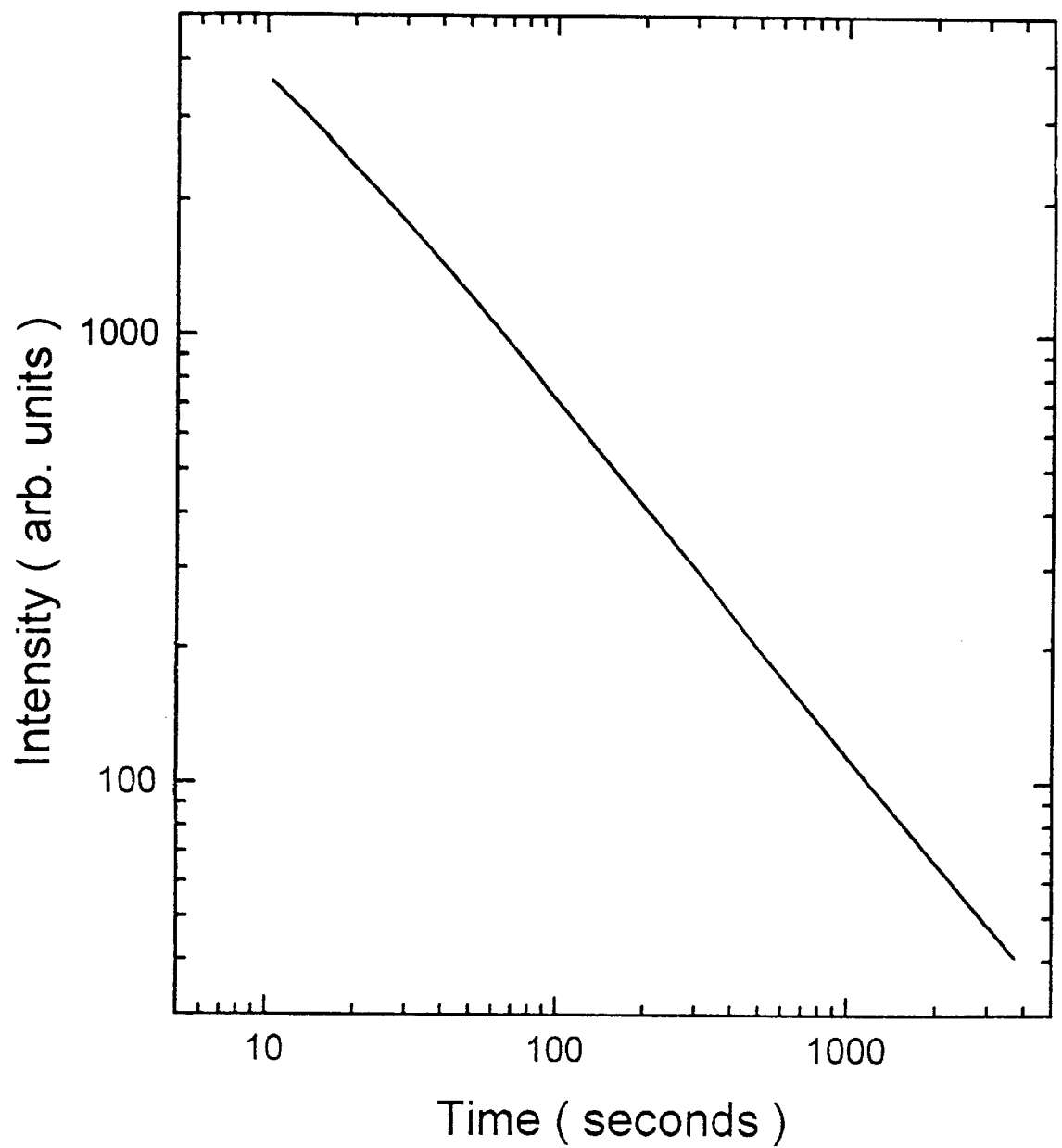
FIG. 15 is a graph of the decay characteristics of the mixed single crystal $Sr_{0.49}Ba_{0.49}Al_2O_3$:0.01$Eu^{2+}$, 0.01 $Dy^{3+}$ after exposure to a 13 W fluorescent lamp.

Single crystal fibers of $Sr_{0.49}Ba_{0.49}Al_2O_3:0.01Eu^{2+}, 0.01 \, Dy^{3+}$ were prepared by combining the following components:

$$0.49 \, SrCo_3 + 0.49 \, BaCO_3 + Al_2O_3 + 0.005 \, Eu_2O_3 + 0.005 \, Dy_2O_3 + 0.05 \, B_2O_3 \text{(optional)}$$

and following the procedures above. The phosphorescent spectrum of the crystals shows a broad peak at 520 nm, similar to that of $SrAl_2O_4:Eu^{2+}, Dy^{3+}$ phosphors. FIG. 15 is a graph of the decay characteristics of the mixed single crystal (a) after exposure to a 13 W fluorescent lamp. The mixed crystal shows very weak phosphorescence compared to $SrAl_2O_4:Eu^{2+}, Dy^{3+}$.

Those of ordinary skill in the art will appreciate that the phosphors of this invention can be prepared using starting materials other than those specifically disclosed herein and that procedures and techniques functionally equivalent to those described herein can be employed to make and assess the phosphors herein. Those of ordinary skill in the art will also appreciate that the host matrix of this invention may accommodate metal ions other than those specifically mentioned herein without significant effect upon phosphor properties.

All references cited herein are incorporated by reference herein to the extent that they are not inconsistent herewith.

We claim:

1. A phosphor represented by the formula:

$$M_kAl_2O_4:2xEU^{2+}, 2yR^{3+}$$

wherein k=1-2x-2y, x is a number ranging from about 0.0001 to about 0.05, y is a number ranging from about 0.0001 to about 0.15, M is an alkaline earth metal, and $R^{3+}$ is one or more trivalent metal ions and wherein a portion of the $Al^{3+}$ in the host is substituted by a divalent ion.

2. The phosphor of claim 1 wherein M is Sr.

3. The phosphor of claim 1 wherein x is a number ranging from about 0.005 to about 0.02.

4. The phosphor of claim 1 wherein the value of y is two times the value of x.

5. The phosphor of claim 1 wherein $R^{3+}$ is selected from the group $Pr^{3+}, Ho^{3+}, Nd^{3+}, Dy^{3+}, Er^{3+}, La^{3+}, Lu^{3+}, Ce^{3+}, Y^{3+}, Sm^{3+}, Gd^{3+}, Tb^{3+}, Tm^{3+}, Yb^{3+}$ and $Bi^{3+}$.

6. The phosphor of claim 1 wherein $R^{3+}$ is $Dy^{3+}$.

7. The phosphor of claim 1 wherein the divalent ion is $Mg^{2+}$ or $Zn^{2+}$ or a mixture thereof.

8. The phosphor of claim 7 wherein the divalent ion is present in the phosphor in an amount about equal to the amount of $R^{3+}$ trivalent metal ion doped into the phosphor.

9. The phosphor of claim 1 which is prepared employing flux.

10. The phosphor of claim 9 wherein the flux is $B_2O_3$ or equivalents thereof.

11. The phosphor of claim 1 represented by the formula:

$$M_kAl_{2-q}O_4 \cdot qXO:2xEu^{2+}, 2yR^{3+}$$

where X is a divalent ion and q is the amount of divalent ion substituted for $Al^{3+}$ in the phosphor and q is a number ranging from about equal to 0.001 to about equal to 0.45.

12. The phosphor of claim 1 wherein M is selected from the group Sr, a mixture of Sr with Ca, a mixture of Sr with Ba or a mixture of Sr, Ca and Ba.

13. The phosphor of claim 1 wherein a portion of the $M^{2+}$ in the phosphor is substituted with a monovalent metal ion.

14. The phosphor of claim 13 wherein the monovalent metal ion is $Na^+$ or $K^+$.

15. The phosphor of claim 13 wherein the monovalent metal ion is present in an amount about equal to the amount of $R^{+3}$ trivalent metal ion in the phosphor.

16. The phosphor of claim 1 which is formed as a single crystal.

17. The phosphor of claim 16 which has the formula:

$$Sr_{0.94}Al_{1.96}O \cdot 0.04MgO:0.02Eu^{2+}, 0.04Dy^{3+}.$$

18. A phosphor represented by the formula:

$$M_kAl_2O_4:2xEu^{2+}, 2y_1R_1^{3+}, 2y_2Y^{3+}$$

wherein k=1-2x-2y, $y_1+y_2=y$, x is a number ranting from about 0.0001 to about 0.05, y is a number ranging from about 0.0001 to about 0.15, M is an alkaline earth metal, and $R_1^{3+}$ is one or more trivalent metal ions.

19. The phosphor of claim 18 wherein M is Sr.

20. The phosphor of claim 18 wherein $R_1^{3+}$ is selected from the group $Pr^{3+}, Ho^{3+}, Nd^{3+}, Dy^{3+}, Er^{3+}, La^{3+}, Lu^{3+}, Ce^{3+}, Sm^{3+}, Gd^{3+}, Tb^{3+}, Tm^{3+}, Yb^{3+}$ and $Bi^{3+}$.

21. The phosphor of claim 18 wherein $R_1^{3+}$ is $Dy^{3+}$.

22. The phosphor of claim 18 wherein M is Sr.

23. The phosphor of claim 18 wherein a portion of the $M^{2+}$ in the phosphor is substituted with a monovalent metal ion.

24. The phosphor of claim 23 wherein the monovalent metal ion is $Na^+$ or $K^+$.

25. The phosphor of claim 18 wherein a portion of the $Al^{3+}$ in the phosphor is substituted with a divalent ion.

26. The phosphor of claim 25 wherein the divalent ion is $Mg^{2+}$ or $Zn^{2+}$.

27. The phosphor of claim 18 wherein x is a number ranging from about 0.005 to about 0.02.

28. The phosphor of claim 18 wherein the value of y is two times the value of x.

29. The phosphor of claim 18 which forms as a single crystal.

30. The phosphor represented by the formula:

$$M_kAl_2O_4:2xEu^{2+}, 2yR^{3+}$$

wherein k=1-2x-2y, x is a number ranging from about 0.0001 to about 0.05, y is a number ranging from about 0.0001 to about 0.15, M is an alkaline earth metal, and $R^{3+}$ is one or more trivalent metal ions and wherein a portion of $M^{2+}$ in the phosphor is substituted by a monovalent metal ion.

31. The phosphor of claim 30 in which the monovalent metal ion is $Na^+$ or $K^+$.

32. The phosphor of claim 31 in which the monovalent metal ion is present in the phosphor in an amount about equal to the amount of $R^{+3}$, trivalent metal ion doped into the phosphor.

33. The phosphor of claim 30 which can be represented by the formula:

$$M_kAl_2O_4 \cdot rZ_2O:2xEu^{2+}, 2yR^{3+}$$

where Z is a monovalent ion and r can range from greater than 0 to about 0.30.

34. The phosphor of claim 30 wherein $R^{3+}$ is selected from the group $Pr^{3+}$, $Ho^{3+}$, $Nd^{3+}$, $Dy^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, $Yb^{3+}$ and $Bi^{3+}$.

35. The phosphor of claim 30 wherein M is Sr.

36. The phosphor of claim 30 wherein $R^{3+}$ is $Dy^{3+}$.

37. The phosphor of claim 30 wherein x is a number ranging from about 0.005 to about 0.02.

38. The phosphor of claim 30 wherein the value of y is two times the value of x.

39. The phosphor represented by the formula:

$$M_kAl_2O_4:2xEu^{2+}, 2yR^{3+}$$

wherein k=1-2x-2y, x is a number ranging from about 0.0001 to about 0.05, y is a number ranging from about 0.0001 to about 0.15, M is an alkaline earth metal, $R^{3+}$ is one or more trivalent metal ions and which is formed as a single crystal.

40. The phosphor of claim 39 wherein M is Sr.

41. The phosphor of claim 39 wherein $R^{3+}$ is $Dy^{3+}$.

42. The phosphor of claim 39 which has the formula $Sr_{0.94}Al_2O_4:0.02Eu^{2+}, 0.04Dy^{3+}$.

43. The phosphor of claim 39 wherein M is Ca and $R^{3+}$ is $Dy^{3+}$.

44. The phosphor of claim 39 wherein M is a mixture of Sr and Ba.

45. A method for making a single crystal phosphor which comprises the steps:

(a) combining phosphor components according to the stoichiometric amounts of the formula:

$$M_kAl_2O_4 \cdot 2xEu^{2+}, 2yR^{3+}$$

wherein k=1-2x-2y, x is a number ranging from about 0.0001 to about 0.05, y is a number ranging from about 0.0001 to about 0.15, M is an alkaline earth metal and $R^{3+}$ is one or more trivalent metal ions, to form a powder;

(b) sintering the powder in a reducing atmosphere;

(c) quenching the sintered material to a temperature below 650° C. to obtain a phosphor material that substantially remains in the β-phase at room temperature; and (d) crystalizing single crystals from the quenched sintered phosphor of step (c) under an inert atmosphere.

46. A method for making a single crystal phosphor which comprises the steps of:

(a) combining the phosphor components according to the stoichiometry of the formula:

$$M_kAl_2O_4:2xEu^{2+}, 2yR^{3+}$$

where k=1-2x-2y, x is a number ranging from about 0.0001 to about 0.05, y is a number ranging from about 0.0001 to about 0.15, M is an alkaline earth metal and $R^{3+}$ is one or more trivalent metal ions to form a powder;

(b) sintering the powder in a reducing atmosphere; and (c) growing single crystals from the sintered powder under an inert atmosphere.

47. The method of claim 46 wherein a flux is combined with phosphor components in step (a).

* * * * *